(12) United States Patent
Shafer

(10) Patent No.: US 8,508,367 B2
(45) Date of Patent: Aug. 13, 2013

(54) CONFIGURABLE MONITORING DEVICE

(75) Inventor: Gary Mark Shafer, Charlotte, NC (US)

(73) Assignee: Checkpoint Systems, Inc.

( * ) Notice: Subject to any disclaimer, the term of this patent is extended or adjusted under 35 U.S.C. 154(b) by 685 days.

(21) Appl. No.: 12/628,863

(22) Filed: Dec. 1, 2009

(65) Prior Publication Data

US 2011/0068921 A1  Mar. 24, 2011

Related U.S. Application Data

(60) Provisional application No. 61/244,320, filed on Sep. 21, 2009, provisional application No. 61/246,393, filed on Sep. 28, 2009, provisional application No. 61/246,388, filed on Sep. 28, 2009, provisional application No. 61/248,223, filed on Oct. 2, 2009, provisional application No. 61/248,228, filed on Oct. 2, 2009, provisional application No. 61/248,242, filed on Oct. 2, 2009, provisional application No. 61/248,233, filed on Oct. 2, 2009, provisional application No. 61/248,239, filed on Oct. 2, 2009, provisional application No. 61/248,269, filed on Oct. 2, 2009, provisional application No. 61/248,196, filed on Oct. 2, 2009.

(51) Int. Cl.
*G08B 13/14* (2006.01)

(52) U.S. Cl.
USPC ............... 340/571; 340/572.1; 340/572.4; 340/10.1; 235/385

(58) Field of Classification Search
USPC ........... 340/571, 572.1, 572.4, 10.1; 235/385
See application file for complete search history.

(56) References Cited

U.S. PATENT DOCUMENTS

| | | |
|---|---|---|
| 3,752,960 A | 8/1973 | Walton |
| 3,816,708 A | 6/1974 | Walton |
| 3,961,323 A | 6/1976 | Hartkorn |
| 3,984,807 A | 10/1976 | Haemmig |
| 4,021,807 A | 5/1977 | Culpepper et al. |
| 4,036,308 A | 7/1977 | Dellenberg |
| 4,063,229 A | 12/1977 | Welsh et al. |
| 4,141,006 A | 2/1979 | Braxton |
| 4,141,078 A | 2/1979 | Bridges, Jr. et al. |
| 4,196,418 A | 4/1980 | Kip et al. |
| 4,209,787 A | 6/1980 | Freeny, Jr. |
| 4,223,830 A | 9/1980 | Walton |

(Continued)

FOREIGN PATENT DOCUMENTS

| | | |
|---|---|---|
| DE | 43 21 650 C1 | 10/1994 |
| EP | 0 449 173 A2 | 10/1991 |

(Continued)

OTHER PUBLICATIONS

Ward, Andy, et al.; "A New Location Technique for the Active Office"; IEEE Personal Communications; Oct. 1997; pp. 42-47.

(Continued)

*Primary Examiner* — Hai Phan
*Assistant Examiner* — Hongmin Fan

(57) ABSTRACT

Provided are embodiments of configurable monitoring devices, methods, systems, computer readable storage media and other means for dynamically transitioning the functionality, roles and/or modes of operation of networked devices. In some examples, the dynamic configuration of the configurable monitoring device may be accomplished wirelessly and used to monitor and track the location of retail products as well as thwart theft of the retail products.

31 Claims, 4 Drawing Sheets

(56) References Cited

U.S. PATENT DOCUMENTS

| | | | |
|---|---|---|---|
| 4,225,953 | A | 9/1980 | Simon et al. |
| 4,242,663 | A | 12/1980 | Slobodin |
| 4,308,530 | A | 12/1981 | Kip et al. |
| 4,327,353 | A | 4/1982 | Beard et al. |
| 4,336,531 | A | 6/1982 | Kincaid |
| 4,366,481 | A | 12/1982 | Main et al. |
| 4,453,636 | A | 6/1984 | Meadows et al. |
| 4,462,022 | A | 7/1984 | Stolarczyk |
| 4,531,117 | A | 7/1985 | Nourse et al. |
| 4,551,712 | A | 11/1985 | Fockens |
| 4,572,976 | A | 2/1986 | Fockens |
| 4,580,041 | A | 4/1986 | Walton |
| 4,630,035 | A | 12/1986 | Stahl et al. |
| 4,656,463 | A | 4/1987 | Anders et al. |
| 4,667,185 | A | 5/1987 | Nourse et al. |
| 4,686,517 | A | 8/1987 | Fockens |
| 4,688,026 | A | 8/1987 | Scribner et al. |
| 4,700,179 | A | 10/1987 | Fancher |
| 4,742,341 | A | 5/1988 | Hogen Esch |
| 4,746,830 | A | 5/1988 | Holland |
| 4,792,018 | A | 12/1988 | Humble et al. |
| 4,814,751 | A | 3/1989 | Hawkins et al. |
| 4,827,395 | A | 5/1989 | Anders et al. |
| 4,837,568 | A | 6/1989 | Snaper |
| 4,857,893 | A | 8/1989 | Carroll |
| 4,862,160 | A | 8/1989 | Ekchian et al. |
| 4,864,280 | A | 9/1989 | van der Meij |
| 4,866,661 | A | 9/1989 | de Prins |
| 4,870,391 | A | 9/1989 | Cooper |
| 4,881,061 | A | 11/1989 | Chambers |
| 4,907,845 | A | 3/1990 | Wood |
| 4,918,432 | A | 4/1990 | Pauley et al. |
| 4,924,210 | A | 5/1990 | Matsui et al. |
| 4,926,161 | A | 5/1990 | Cupp |
| 4,951,029 | A | 8/1990 | Severson |
| 4,961,533 | A | 10/1990 | Teller et al. |
| 5,006,830 | A | 4/1991 | Merritt |
| 5,008,660 | A | 4/1991 | de Jong |
| 5,014,206 | A | 5/1991 | Scribner et al. |
| 5,019,813 | A | 5/1991 | Kip et al. |
| 5,019,815 | A | 5/1991 | Lemelson et al. |
| 5,021,767 | A | 6/1991 | Fockens et al. |
| 5,031,098 | A | 7/1991 | Miller et al. |
| 5,036,308 | A | 7/1991 | Fockens |
| 5,039,996 | A | 8/1991 | Fockens |
| 5,051,727 | A | 9/1991 | Fockens |
| 5,057,677 | A | 10/1991 | Bertagna et al. |
| 5,059,951 | A | 10/1991 | Kaltner |
| 5,068,641 | A | 11/1991 | Hogen Esch |
| 5,072,222 | A | 12/1991 | Fockens |
| 5,099,226 | A | 3/1992 | Andrews |
| 5,099,227 | A | 3/1992 | Geiszler et al. |
| 5,103,222 | A | 4/1992 | Hogen Esch et al. |
| 5,105,190 | A | 4/1992 | Kip et al. |
| 5,119,070 | A | 6/1992 | Matsumoto et al. |
| 5,119,104 | A | 6/1992 | Heller |
| 5,124,699 | A | 6/1992 | Tervoert et al. |
| 5,151,684 | A | 9/1992 | Johnsen |
| 5,153,562 | A | 10/1992 | van Breemen |
| 5,153,842 | A | 10/1992 | Dlugos, Sr. et al. |
| 5,181,786 | A | 1/1993 | Hujink |
| 5,214,409 | A | 5/1993 | Beigel |
| 5,214,410 | A | 5/1993 | Verster |
| 5,218,343 | A | 6/1993 | Stobbe et al. |
| 5,254,974 | A | 10/1993 | Rebers et al. |
| 5,288,980 | A | 2/1994 | Patel et al. |
| 5,317,309 | A | 5/1994 | Vercellotti et al. |
| 5,361,071 | A | 11/1994 | van Zon |
| 5,365,516 | A | 11/1994 | Jandrell |
| 5,367,291 | A | 11/1994 | Fockens |
| 5,396,224 | A | 3/1995 | Dukes et al. |
| 5,426,667 | A | 6/1995 | van Zon |
| 5,428,214 | A | 6/1995 | Hakkers et al. |
| 5,446,701 | A | 8/1995 | Utke et al. |
| 5,543,797 | A | 8/1996 | Hochstein et al. |
| 5,596,313 | A | 1/1997 | Berglund et al. |
| 5,608,380 | A | 3/1997 | Hogen Esch |
| 5,671,362 | A | 9/1997 | Cowe et al. |
| 5,709,942 | A | 1/1998 | Leydon et al. |
| 5,764,147 | A | 6/1998 | Sasagawa et al. |
| 5,874,896 | A | 2/1999 | Lowe et al. |
| 5,881,846 | A | 3/1999 | French et al. |
| 5,942,978 | A | 8/1999 | Shafer |
| 5,955,951 | A | 9/1999 | Wischerop et al. |
| 6,061,914 | A | 5/2000 | Legrand |
| 6,125,972 | A | 10/2000 | French et al. |
| 6,155,087 | A | 12/2000 | Necchi |
| 6,181,248 | B1 | 1/2001 | Fockens |
| 6,380,894 | B1 | 4/2002 | Boyd et al. |
| 6,486,768 | B1 | 11/2002 | French et al. |
| 6,486,769 | B1 | 11/2002 | McLean |
| 6,497,125 | B1 | 12/2002 | Necchi |
| 6,512,478 | B1 | 1/2003 | Chien |
| 6,703,934 | B1 | 3/2004 | Nijman et al. |
| 6,750,765 | B1 | 6/2004 | van Wijk |
| 6,762,691 | B2 | 7/2004 | Piazza |
| 6,832,498 | B2 | 12/2004 | Belden, Jr. |
| 6,837,427 | B2 | 1/2005 | Overhultz et al. |
| 6,861,954 | B2 | 3/2005 | Levin |
| 6,920,769 | B2 | 7/2005 | Huehner |
| 6,951,305 | B2 | 10/2005 | Overhultz et al. |
| 6,975,205 | B1 | 12/2005 | French et al. |
| 7,007,523 | B2 | 3/2006 | Belden, Jr. |
| 7,020,501 | B1 | 3/2006 | Elliott et al. |
| 7,021,535 | B2 | 4/2006 | Overhultz et al. |
| 7,046,149 | B1 | 5/2006 | Badenhop et al. |
| 7,061,367 | B2 | 6/2006 | Mosgrove et al. |
| 7,084,766 | B2 | 8/2006 | Sayegh et al. |
| 7,084,769 | B2 | 8/2006 | Bauer et al. |
| 7,109,867 | B2 | 9/2006 | Forster |
| 7,148,804 | B2 | 12/2006 | Salesky et al. |
| 7,148,805 | B2 | 12/2006 | Hogan |
| 7,161,489 | B2 | 1/2007 | Sullivan et al. |
| 7,162,899 | B2 | 1/2007 | Fawcett et al. |
| 7,194,880 | B2 | 3/2007 | Necchi |
| 7,225,903 | B2 | 6/2007 | Nebolon et al. |
| 7,233,241 | B2 | 6/2007 | Overhultz et al. |
| 7,249,401 | B2 | 7/2007 | Copen et al. |
| 7,259,674 | B2 | 8/2007 | Marsilio et al. |
| 7,266,979 | B2 | 9/2007 | Belden, Jr. |
| 7,287,491 | B2 | 10/2007 | Zents et al. |
| 7,304,574 | B2 | 12/2007 | Romer et al. |
| 7,304,591 | B2 | 12/2007 | Raphaeli |
| 7,310,070 | B1 | 12/2007 | Hardman et al. |
| 7,336,180 | B2 | 2/2008 | Sayegh et al. |
| 7,336,183 | B2 | 2/2008 | Reddy et al. |
| 7,342,495 | B2 | 3/2008 | Sayegh |
| 7,374,096 | B2 | 5/2008 | Overhultz et al. |
| 7,378,967 | B2 | 5/2008 | Sullivan et al. |
| 7,394,376 | B1 | 7/2008 | Sayegh et al. |
| 7,405,661 | B2 | 7/2008 | Badenhop et al. |
| 7,420,461 | B2 | 9/2008 | Nebolon et al. |
| 7,423,516 | B2 | 9/2008 | Overhultz |
| 7,443,298 | B2 | 10/2008 | Cole et al. |
| 7,450,024 | B2 | 11/2008 | Wildman et al. |
| 7,466,224 | B2 | 12/2008 | Ward et al. |
| 7,474,209 | B2 | 1/2009 | Marsilio et al. |
| 7,504,952 | B2 | 3/2009 | Kaplan et al. |
| 7,510,123 | B2 | 3/2009 | Overhultz et al. |
| 7,511,604 | B2 | 3/2009 | Raphaeli et al. |
| 7,535,337 | B2 | 5/2009 | Overhultz et al. |
| 7,549,579 | B2 | 6/2009 | Overhultz et al. |
| 7,570,161 | B2 | 8/2009 | Necchi |
| 7,583,195 | B2 | 9/2009 | Chua et al. |
| 7,604,178 | B2 | 10/2009 | Steward |
| 7,636,062 | B2 | 12/2009 | Ward et al. |
| 7,649,490 | B2 | 1/2010 | Park et al. |
| 7,652,576 | B1 | 1/2010 | Crossno et al. |
| 7,657,740 | B2 | 2/2010 | Numao et al. |
| 7,717,326 | B2 | 5/2010 | Kumhyr et al. |
| 7,733,836 | B2 | 6/2010 | Huseth |
| 7,755,485 | B2 | 7/2010 | Howard et al. |
| 7,782,207 | B2 | 8/2010 | Gillard et al. |
| 7,791,485 | B2 | 9/2010 | Lahiri |

| | | |
|---|---|---|
| 7,800,490 B2 | 9/2010 | Allen et al. |
| 7,952,464 B2 * | 5/2011 | Nikitin et al. ............... 340/10.1 |
| 7,954,712 B2 | 6/2011 | Babcock |
| 7,994,911 B2 | 8/2011 | Mercier et al. |
| 8,026,814 B1 * | 9/2011 | Heinze et al. ............. 340/572.1 |
| 2002/0153418 A1 | 10/2002 | Maloney |
| 2003/0128100 A1 | 7/2003 | Burkhardt |
| 2003/0145441 A1 | 8/2003 | Andersson et al. |
| 2003/0160697 A1 | 8/2003 | Sedon et al. |
| 2003/0216969 A1 | 11/2003 | Bauer et al. |
| 2003/0222780 A1 | 12/2003 | Sayegh et al. |
| 2004/0104817 A1 | 6/2004 | Wijk |
| 2004/0160304 A1 | 8/2004 | Mosgrove et al. |
| 2005/0110636 A1 | 5/2005 | Ghaffari |
| 2005/0197720 A1 | 9/2005 | Morrison et al. |
| 2005/0236479 A1 | 10/2005 | Schmidtberg et al. |
| 2005/0242921 A1 | 11/2005 | Zimmerman et al. |
| 2005/0242957 A1 | 11/2005 | Lindsay et al. |
| 2005/0270155 A1 | 12/2005 | Sayegh |
| 2006/0022815 A1 | 2/2006 | Fischer et al. |
| 2006/0033662 A1 | 2/2006 | Ward et al. |
| 2006/0049250 A1 | 3/2006 | Sullivan |
| 2006/0049946 A1 | 3/2006 | Sullivan et al. |
| 2006/0059367 A1 | 3/2006 | Yarvis |
| 2006/0081020 A1 | 4/2006 | Hsiao et al. |
| 2006/0092016 A1 | 5/2006 | Modes et al. |
| 2006/0109125 A1 | 5/2006 | Overhultz et al. |
| 2006/0181393 A1 | 8/2006 | Raphaeli |
| 2006/0187042 A1 | 8/2006 | Romer et al. |
| 2006/0202033 A1 | 9/2006 | Campero et al. |
| 2006/0208080 A1 | 9/2006 | Overhultz et al. |
| 2006/0214773 A1 | 9/2006 | Wagner et al. |
| 2006/0220862 A1 | 10/2006 | Campero et al. |
| 2006/0220873 A1 | 10/2006 | Campero et al. |
| 2006/0220874 A1 | 10/2006 | Campero et al. |
| 2006/0220875 A1 | 10/2006 | Campero et al. |
| 2006/0220876 A1 | 10/2006 | Campero et al. |
| 2006/0250247 A1 | 11/2006 | Sayegh et al. |
| 2006/0290519 A1 | 12/2006 | Boate et al. |
| 2007/0018787 A1 | 1/2007 | Martinez de Velasco Cortina et al. |
| 2007/0024448 A1 | 2/2007 | Sayegh |
| 2007/0050261 A1 | 3/2007 | Lin |
| 2007/0096873 A1 | 5/2007 | Sadr |
| 2007/0096876 A1 | 5/2007 | Bridgelall et al. |
| 2007/0106518 A1 | 5/2007 | Wildman et al. |
| 2007/0120669 A1 | 5/2007 | Belden, Jr. |
| 2007/0178911 A1 | 8/2007 | Baumeister et al. |
| 2007/0188318 A1 | 8/2007 | Cole et al. |
| 2007/0205896 A1 | 9/2007 | Beber et al. |
| 2007/0210920 A1 | 9/2007 | Panotopoulos |
| 2007/0222596 A1 * | 9/2007 | Kleijn et al. ............... 340/572.1 |
| 2007/0257857 A1 | 11/2007 | Marino et al. |
| 2007/0285241 A1 | 12/2007 | Griebenow et al. |
| 2007/0290802 A1 | 12/2007 | Batra et al. |
| 2007/0290924 A1 | 12/2007 | McCoy |
| 2008/0012710 A1 | 1/2008 | Sadr |
| 2008/0030422 A1 | 2/2008 | Gevargiz et al. |
| 2008/0039023 A1 | 2/2008 | Ward |
| 2008/0106416 A1 | 5/2008 | Sullivan et al. |
| 2008/0122610 A1 | 5/2008 | Muirhead |
| 2008/0143532 A1 | 6/2008 | Murrah |
| 2008/0156047 A1 | 7/2008 | Sayegh |
| 2008/0157979 A1 | 7/2008 | Sayegh |
| 2008/0165014 A1 | 7/2008 | Sayegh |
| 2008/0174404 A1 | 7/2008 | Gopalan et al. |
| 2008/0174437 A1 | 7/2008 | Arguin |
| 2008/0186136 A1 | 8/2008 | Raphaeli et al. |
| 2008/0197982 A1 | 8/2008 | Sadr |
| 2008/0198001 A1 | 8/2008 | Sarma |
| 2008/0224869 A1 | 9/2008 | Kaplan |
| 2008/0246613 A1 | 10/2008 | Linstrom et al. |
| 2008/0273684 A1 | 11/2008 | Profanchik |
| 2008/0274630 A1 | 11/2008 | Shelton et al. |
| 2008/0279307 A1 | 11/2008 | Gaffney et al. |
| 2008/0283599 A1 | 11/2008 | Rasband et al. |
| 2008/0284601 A1 | 11/2008 | Sayegh et al. |
| 2008/0307076 A1 | 12/2008 | Ewing et al. |
| 2009/0022078 A1 | 1/2009 | Patterson et al. |
| 2009/0051536 A1 | 2/2009 | Lahiri |
| 2009/0079573 A1 | 3/2009 | Jiang et al. |
| 2009/0079633 A1 | 3/2009 | Ward |
| 2009/0080423 A1 | 3/2009 | Ewing |
| 2009/0080455 A1 | 3/2009 | Ewing et al. |
| 2009/0091451 A1 | 4/2009 | Jones et al. |
| 2009/0098898 A1 | 4/2009 | Patterson |
| 2009/0103671 A1 | 4/2009 | Raphaeli et al. |
| 2009/0133972 A1 | 5/2009 | Means et al. |
| 2009/0146792 A1 | 6/2009 | Sadr et al. |
| 2009/0167502 A1 | 7/2009 | Erickson et al. |
| 2009/0185505 A1 | 7/2009 | Ripstein et al. |
| 2009/0198529 A1 | 8/2009 | Burkholder et al. |
| 2009/0224918 A1 | 9/2009 | Copeland |
| 2009/0229327 A1 | 9/2009 | Valade, Jr. et al. |
| 2009/0309732 A1 | 12/2009 | Truscott et al. |
| 2009/0309736 A1 | 12/2009 | Heurtier |
| 2010/0065362 A1 | 3/2010 | Shimura et al. |
| 2010/0097223 A1 | 4/2010 | Kruest et al. |
| 2010/0102929 A1 | 4/2010 | Haumann |
| 2010/0133126 A1 | 6/2010 | Shute et al. |
| 2010/0141445 A1 | 6/2010 | Venkatasubramaniyam et al. |
| 2010/0201488 A1 | 8/2010 | Stern et al. |
| 2010/0201520 A1 | 8/2010 | Stern et al. |
| 2011/0068906 A1 | 3/2011 | Shafer et al. |
| 2011/0072132 A1 | 3/2011 | Shafer et al. |

FOREIGN PATENT DOCUMENTS

| | | |
|---|---|---|
| EP | 0 867 108 A1 | 9/1998 |
| EP | 1 316 814 A1 | 6/2003 |
| EP | 1 610 258 A1 | 12/2005 |
| FR | 2 862 999 A1 | 6/2005 |
| GB | 2 205 426 A | 12/1988 |
| JP | 63059812 A | 3/1988 |
| JP | 2000 238817 A | 9/2000 |
| WO | WO 98/16849 A1 | 4/1998 |
| WO | WO 01/06401 A1 | 1/2001 |
| WO | WO 02/103645 A2 | 12/2002 |
| WO | WO 2004/018811 A1 | 3/2004 |
| WO | WO 2006/076348 A2 | 7/2006 |
| WO | WO 2006/081650 A1 | 8/2006 |
| WO | WO 2007/070103 A1 | 6/2007 |
| WO | WO 2007/142595 A1 | 12/2007 |
| WO | WO 2007/146818 A2 | 12/2007 |
| WO | WO 2008/055323 A2 | 5/2008 |
| WO | WO 2008/132269 A1 | 11/2008 |

OTHER PUBLICATIONS

International Search Report and Written Opinion for International Application No. PCT/US2009/066572, mailed Nov. 8, 2010.
International Search Report and Written Opinion for International Application No. PCT/US2010/049653, mailed Dec. 6, 2010.
International Preliminary Report on Patentability for International Application No. PCT/US2010/049653, mailed Apr. 5, 2012.
Wailgum, Thomas; "RFID Tags Arrive on Store Floor as Retailers Go After ROI"; Network World at http://www.networkworld.com/news/2010/072810-rfid-tags-arrive-on-store.html; ; Jul. 28, 2010; 2 pages.
International Search Report and Written Opinion for International Application No. PCT/US2010/049520, mailed Mar. 17, 2011;17 pages.
International Preliminary Report on Patentability from International Application No. PCT/US2010/050561, mailed Apr. 12, 2012.
International Search Report and Written Opinion for International Application No. PCT/US2010/050561, mailed Dec. 6, 2010.
International Search Report for International Application No. PCT-FR2004-001186, mailed Dec. 17, 2004.
Juels et al., "The Blocker Tag: Selective Blocking of RFID Tags for Consumer Privacy", CCS '03, Oct. 27-30, 2003.
Weinstein,David H., "Alanco Technologies, Inc.", Apr. 23, 2003.
Bhargava, Hersh, "Building Smart RFID Networks", Jun. 11, 2007.
Potdar et al., "Tamper Detection for Ubiquitous RFID-enabled Supply Chain", Dec. 31, 2005.
International Search Report and Written Opinion from International Application No. PCT/US2010/051141, mailed Feb. 15, 2011.
International Preliminary Report on Patentability from International Application No. PCT/US2010/051141, mailed Apr. 3, 2012.

International Search Report and Written Opinion from International Application No. PCT/US2010/049656, mailed Dec. 6, 2010.
International Preliminary Report on Patentability from International Application No. PCT/US2010/049656, mailed Apr. 5, 2012.

International Search Report and Written Opinion from International Application No. PCT/US2010/049672, mailed Sep. 12, 2011.

* cited by examiner

CONFIGURABLE MONITORING DEVICE

CROSS REFERENCE TO RELATED APPLICATIONS

This patent application claims priority from U.S. Provisional Patent Application No. 61/244,320, filed Sep. 21, 2009, entitled "A Configurable Monitoring Device;" U.S. Provisional Patent Application No. 61/246,393, filed Sep. 28, 2009, entitled "Systems, Methods and Apparatuses for Managing Configurable Monitoring Devices;" U.S. Provisional Patent Application No. 61/246,388, filed Sep. 28, 2009, entitled "A Configurable Monitoring Device;" U.S. Provisional Patent Application No. 61/248,223, filed Oct. 2, 2009, entitled "Employment of a Configurable Monitoring Device as an Inventory Management Tool;" U.S. Provisional Patent Application No. 61/248,228, filed Oct. 2, 2009, entitled "Employment of a Configurable Monitoring Device as a Marketing Tool;" U.S. Provisional Patent Application No. 61/248,242, filed Oct. 2, 2009, entitled "Configurable Monitoring Device Having Bridge Functionality;" U.S. Provisional Patent Application No. 61/248,233, filed Oct. 2, 2009, entitled "Employment of a Configurable Monitoring Device as a Personal Identifier for Facilitating Transactions;" U.S. Provisional Patent Application No. 61/248,239, filed Oct. 2, 2009, entitled "Employment of a Configurable Monitoring Device as a Security Tool;" U.S. Provisional Patent Application No. 61/248,269, filed Oct. 2, 2009, entitled "Key for Commissioning, Decommissioning and Unlocking Configurable Monitoring Devices;" and U.S. Provisional Patent Application No. 61/248,196, filed Oct. 2, 2009, entitled "Systems, Methods and Apparatuses for Locating Configurable Monitoring Devices," which are each hereby incorporated herein by reference in its entirety.

TECHNOLOGICAL FIELD

Embodiments of the present invention relate generally to monitoring device technology and, more particularly, relate to a dynamically configurable monitoring device for use in connection with monitoring activities associated with one or more articles such as retail products.

BACKGROUND

Conventional retail security devices, such as passive Radio Frequency ID (RFID) tags or electronic article surveillance (EAS) tags perform limited roles within retail security systems. Furthermore, the typical roles of such tags are static. For example, once configured at the time of manufacturing, an EAS tag can only operate within the role of a device that facilitates triggering the sounding of an alarm when the device passes through an EAS gate. As such, RFID tags and EAS tags are often one dimensional, or at least relatively limited in their ability to enhance operations of a retail store or other entity. Such inflexibility of these types of tags prevents or severely limits the ability of a user to reconfigure their security system or get other information from the tags. For example, when a retail business chooses to change the arrangement of the products within the store, a corresponding change to the security system may also be required.

Accordingly, it may be desirable to develop a retail monitoring system with tags that are not limited in their configuration.

BRIEF SUMMARY OF EXEMPLARY EMBODIMENTS

Some example embodiments of the present invention are therefore provided that may enable the provision of a configurable monitoring device that may have a relatively high degree of flexibility in terms of employment and configuration. In this regard, some embodiments may provide a configurable monitoring device that can be dynamically configured to change functionality, roles and/or modes of operation. In some examples, the dynamic configuration of the configurable monitoring device may be accomplished wirelessly within a network of configurable monitoring devices.

Within the network, one or more of the monitoring devices can comprise a processor, which can be configured to receive an indication of a triggering event. In response to receiving the indication of the triggering event the processor can be configured to cause the monitoring device to transition into a triggered role. The triggered role being one of a tag role or a node role, among other things. In some embodiments, the tag role includes configuring the processor to determine location information relating to the monitoring device. In other embodiments, the tag role can include, instead of or in addition to locally determining location information, configuring the processor to repeat, or relay, any received data to a network entity, which can then help determine the location of the monitoring device. The location information can be relatively complex or simple (e.g., an identifier number of one or more other nodes the monitoring device "hears").

The monitoring device's node role can include configuring the processor to transmit a ping signal. A ping signal can comprise a relatively small amount of data (e.g., only the node identifier information) and/or relatively more data (such as that common to "beacon" signals used in wireless communications, some of which may be 802.11.4 compliant). The node role can also comprise configuring the processor to forward a tag communication to a network entity.

The monitoring device can be configured to receive data that includes instructions to transition the monitoring device. The instructions can be included in the indication of the triggering event and/or be sent by a network entity.

In some embodiments, the monitoring device's processor can be further configured to receive a second indication of a second triggering event and, in response, transition from the triggered role to a second triggered role. For example, the monitoring device can transition from a tag role, to a node role, back to a tag role. In some embodiments, the indication of the triggering event can be a wireless signal that is broadcast wirelessly and received by one or more monitoring devices' antennas. Despite a plurality of monitoring devices receiving the indication, the indication of the triggering event can include a monitoring device identifier or other information that causes only one of the monitoring devices to execute its transition into the triggered role. As another example, a directional antenna (which may allow only one monitoring device or a subset of the monitoring devices to receive the indication), any other means, and/or a combination thereof can be used to target one or more monitoring devices for transitioning.

The indication of the triggering event can be, for example, an output of a sensor. The sensor can be integrated inside the housing of the monitoring device, making the sensor an internal component of the monitoring device. Some examples of internal components include a motion detector (e.g., jiggle switch, accelerometer, etc.), a tamper detection component (which can be separate from or part of a mounting device used to affix the monitoring device to an article), or any other internal component that could be integrated into the monitoring device, some additional examples of which are discussed herein.

The sensor can be configured to detect the triggering event and output the indication of the triggering event. For example, the triggering event could be movement and, in response to the sensor determining that the monitoring device is moving, the sensor can output the indication to the monitoring device's processor (and/or any other component or device).

In some embodiments, the sensor can be external to the monitoring device, such as, e.g., in an external device. The sensor can produce an output that is then relayed wirelessly or by any other means to the monitoring device. For example, the external device can be another device functioning as a node device. Other examples of external devices that can send the monitoring device the indication of a triggering event include, e.g., an RFID device (such as those that are handheld or mounted in a counter or other piece of furniture), a network entity, an EAS gate, or any other device that can be configured to emit and/or generate an indication of a triggering event and/or an alarm event.

The monitoring device can also include an audio device configured to emit audio signals. In some embodiments, the audio device may only be operable when the monitoring device is in the tag role. The monitoring device's processor can be further configured to receive an alarm indication of an alarm event while in the tag role and send a signal to the audio device, causing the audio device to emit the audio signal. An alarm event can be similar to or a type of triggering event and an alarm indication can be similar to or a type of an indication of the triggering event. For example, the alarm event can be an event, such as determining someone is trying to steal the article to which the monitoring device is attached (based on, e.g., suspicious movement profile). The alarm indication, for example, can be any type of indication, including a wireless or other type of signal that corresponds with an alarm event and/or can convey, to the monitoring device and/or network entity, that an alarm event occurred. For example, the monitoring device's processor and/or the network entity can receive the alarm indication from an external security device, such as an EAS gate and/or internal component that is configured to generate an output in response to being in communication proximity with an EAS gate. As another example, a node can be placed near a store's exit and the monitoring device can be configured to interpret hearing that node's ping signal as an alarm indication (with the alarm event being that monitoring device being too close to the store's exit).

In some embodiments, the external security device can be a second monitoring device. The external security device can be in communication proximity to the monitoring device and the external security device and/or the monitoring device can be affixed to a retail product. In such embodiments, the external security device can be located at a store's exit and be used to detect an alarm event.

As used herein, "communication proximity" refers to the distance in which direct communications can exist wirelessly between two devices. This distance can be dependent on a number of variables includes power output, frequency, signal reception factors (including physical and electrical interference variables), and/or any other variable. For example, if a monitoring device is in communication proximity of a node device, the monitoring device can "hear" the node device's ping signal(s).

In some embodiments, the monitoring device can comprise a battery and/or various other components. For example, the monitoring device can comprise a mounting device configured to affix the monitoring device to a retail article. The monitoring device can also comprise memory configured to store attribute information (e.g., bar code data, color data, price data, etc.) associated with the retail article. As another example, the monitoring device can include a display configured to display human-readable information and/or a light emitting component (which can be used to indicate battery power, an error message, communication functionality, etc.).

In some embodiments, the monitoring device can be configured for position tracking of an article (such as a retail item, book, computer, casino chip, money, personal identification card, passport, etc.). The monitoring device's processor can be configured to receive a ping signal from a ping node; determine location information relating to the monitoring device based at least in part on receiving the ping signal; and report the location information to a network entity. The network entity can comprise one or more additional apparatuses, including a server and network management and/or monitoring system.

In some embodiments, the monitoring device and/or network entity determine a location zone of the monitoring device in response to the monitoring device receiving a ping signal from the ping node or other device functioning as a ping node (both of which are sometimes referred to herein as a "node device" or "node"). The monitoring device's processor can then retrieve (e.g., request and receive), from local or remote memory, a zone-based functionality profile that corresponds with the location zone. When the functionality profile is downloaded from remote memory (such as, e.g., the memory of a network entity), the processor can be configured to store the functionality profile in the monitoring device's internal memory.

The functionality profile can be zone-based and correspond with one or more zones that represent an area of a physical space, such as a retail store or warehouse. The zones can also be relative to the position of one or more other devices, such as a node device, door, etc.

The monitoring device can comprise an audible alarm that is activated by the processor in response to the zone-based functionality profile including an alarm activation instruction and/or any other instructions (such as, e.g., an unlocking instruction for the monitoring device's attachment mechanism, etc.). In some embodiments, an alarm may also be initiated at the network entity in response to determining an alarm event has occurred.

The monitoring device's processor can be further configured to, in response to receiving the ping signal from the ping node, determine a location zone. Determining a location zone can include, for example, determining the ping node's identifier which is broadcast as or encoded within the ping signal. In some embodiments, the network entity can be configured to determine the applicable zone-based functionality profile for the monitoring device, in response to the monitoring device repeating the ping signal(s) the monitoring device received. The monitoring device's processor can then retrieve, from the network entity, the zone-based functionality profile that corresponds with the monitoring device's location zone.

The monitoring device and the ping node can establish and execute a uni-directional communication protocol. The uni-direction communication protocol can allow, for example, the ping node to wirelessly broadcast data (as, e.g., a ping signal), which the monitoring device can receive. As mentioned elsewhere herein, the data can include, e.g., the ping node's identifier and/or other information. While the monitoring device may or may not broadcast a response to the ping node, the ping node can be configured to only send data to the monitoring device (e.g., lack the components necessary to receive data from the monitoring device). In some embodiments, the ping node can receive data from a network entity, even though the ping node lacks the ability to receive data from a monitoring device. In some embodiments, the monitoring device may be configured to respond to (e.g., confirm receipt for) all ping node signals it receives. In other embodiments, the uni-directional communication protocol lacks the monitoring device transmitting data intended for the ping node.

The monitoring device can also establish and execute a bi-directional communication protocol with the ping node and/or the network entity. The bi-directional communication protocol can allow for two way communications, including sending and receiving of signals between each device participating in the communication protocol.

The monitoring device can be further configured to receive a second ping signal from a second ping node. The second ping signal can be used by the monitoring device and/or network entity to determine second location information (such as identifying information of the second ping node) relating to the monitoring device. The uni-directional, bi-direction or any other communication protocol can be established between the monitoring device and the second ping node. The communication protocol between the monitoring device and the second ping node can be related to or independent from the communication protocol used between the monitoring device and the first ping node.

A location zone can be determined by the monitoring device and/or the network entity based on the first location information and the second location information. The first and second location information can respectively comprise the first ping node's and the second ping node's identification data. The network entity and/or the monitoring device, knowing where those ping nodes are physically located, can then derive the approximate position of the monitoring device. In such embodiments, a more accurate location can be derived from more ping node information. The location (relative to the ping node and/or absolute in a given space) can be used to access memory (remote or local to the monitoring device) and retrieve a zone-based functionality profile that can include instructions and other executable commands for the monitoring device and/or other device(s). For example, the monitoring device can comprise an audible alarm that is activated by the processor in response to the zone-based functionality profile including an alarm activation instruction. As another example, the monitoring device can comprise a mounting device that is unlocked in response to the zone-based functionality profile including an unlock instruction, wherein the mounting device is configured to affix the monitoring device to a retail article. The monitoring device can also include an antenna that the processor uses to transmit and/or receive data associated with the location zone to the network entity, ping node device, and/or any other external device.

The monitoring device's processor can be further configured to engage a timer; receive an indication of a trigger event, wherein the indication results from the timer expiring. In some embodiments, rather than engage a time within the processor, any other type of time keeping component can be implemented, including a clock, etc. In response to receiving the indication of the trigger event, the monitoring device can enter a wake mode and subsequent to reporting the location information to the network entity, reset the timer and enter a sleep mode.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
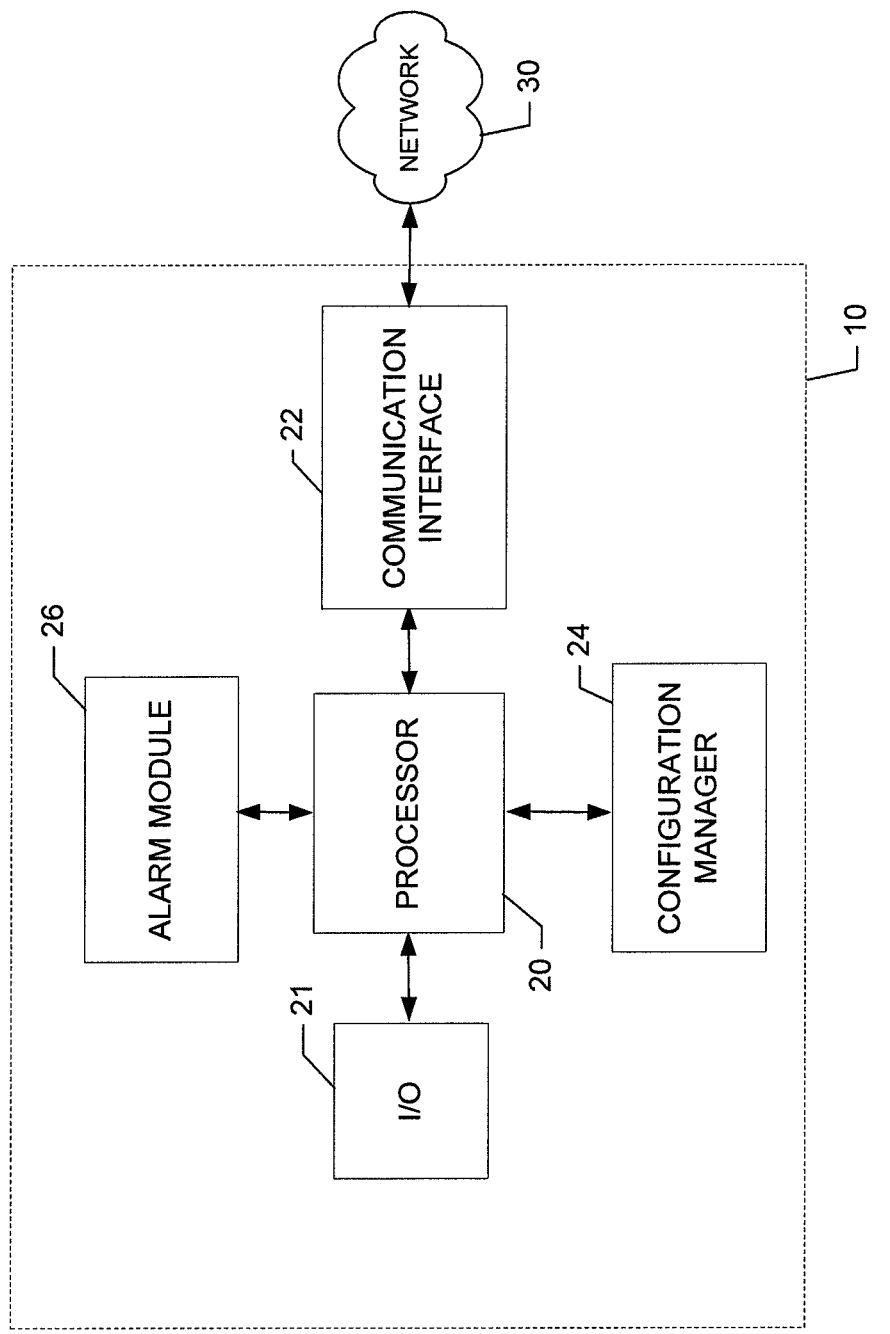
FIG. 1 is a block diagram showing various functional components of a configurable monitoring device according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As defined herein a "computer-readable storage medium," which refers to a physical storage medium (e.g., volatile or non-volatile memory device), can be differentiated from a "computer-readable transmission medium," which refers to an electromagnetic signal. Additionally, as used herein, the term "circuitry" refers to not only hardware-only circuit implementations including analog and/or digital circuitry, but at least also to combinations of circuits with corresponding software and/or instructions stored on a computer-readable storage medium.

As indicated above, some example embodiments of the present invention may enable the provision of a flexible configurable monitoring device that can, among other things, transition among various functional roles. Moreover, the configurable monitoring device may be dynamically configurable over-the-air to change its functionality, change its role within a network of configurable monitoring devices and/or change its modes of operation. As an example, a configurable monitoring device of an exemplary embodiment may be originally configured to provide network support for inventory management or marketing functions. Via wireless communication, the configurable monitoring device may have its configuration changed to provide theft deterrence, product tracking or other retail functions. The multi-mode and dynamically configurable nature of the configurable monitoring device may provide for increased utility of a monitoring system that may be employed to monitor products in retail or other operational environments.

In an exemplary embodiment, the configurable monitoring device described herein may be mounted or otherwise placed within an environment being monitored to facilitate the monitoring activity desired in the environment. For example, configurable monitoring devices may be strategically placed within shopping malls, shopping centers, retail stores and/or the parking lots of retail stores (e.g., on light posts within the parking lot) to facilitate performing various security, marketing, and inventory functionalities. In some situations, a plurality of configurable monitoring devices may form a network (e.g., a mesh network, star network, hybrid mesh/star network, or the like) of devices used for handling various different roles in connection with monitoring the environment in which such devices are distributed. In addition to the network or monitoring system described herein, a description of a monitoring system comprised of configurable monitoring device is provided in U.S. Provisional Patent Application 61/244,320 filed Sep. 21, 2009, entitled "A Configurable Monitoring Device", the content of which is hereby incorporated by reference in its entirety. One or more configurable monitoring devices may be affixed to respective products or other articles (e.g., retail products) to facilitate monitoring of the article to which each configurable monitoring device is affixed. Each such device may be configured to have a corresponding role (e.g., as a tag, node, etc.) via configuration information that may be dynamically provided thereto or dynamically selected to define the mode of operation of the respective configurable monitoring device. The configuration information may include software and/or firmware instructions that may be stored and/or executed at the configurable monitoring device to define the configuration and therefore the operation of the configurable monitoring device. For example, a triggering event (some examples of which are discussed below) can cause an indication of the triggering event to be generated and sent to the monitoring device. The monitoring device can then receive the indication and transition into a triggered role (e.g., a tag role or node role). As such, one or more other configurable monitoring devices may be configured (e.g., dynamically in some cases) to take on a different role, such as being a node device, with which one or more devices in tag mode may communicate. As such, a network of multi-modal and flexibly (and dynamically) configurable monitoring devices may be created to provide enhanced monitoring capability for the provision of real-time tracking, theft protection services, inventory services, marketing services and numerous other functions.

To support the various functionalities, a monitoring system may be constructed and operated using configurable monitoring devices configured as nodes and tags. A node may be a stationary device associated with a sales floor display, an area of the sales floor, a fitting room, a storage room, or the like. Tags may be affixed to articles for purchase within a retail sales environment. The nodes may be configured to provide a wireless signal that may be received by tags that are within range. According to some example embodiments, the range of a node or the power of the signal provided by the node, either or both of which can help define the boundaries of the node's communication proximity, may be set based on the size of the area that the node is responsible for. For example, if the node is associated with a small floor display, the signal power may be relatively low so only the area of the small floor display is in communication proximity of the node. On the other hand, if a node is responsible for a large shelf unit, the signal power may be set to a higher level to ensure coverage of the entire shelf unit is in communication proximity of the node. Tags may be configured to receive a signal that is associated with any node in communication proximity and respond to the node indicating that the tag is now associated with the node, for example, because the tag is located on the floor display associated with the node. While the tag may respond to a node in all situations, the node may be configured to execute a uni-directional communications protocol, which prevents the node from receiving the tag's response. In some embodiments, the tag may know that the node(s) is/are configured to implement a uni-directional communications protocol and, as a result, not send a response to any node signal it receives. In other embodiments, the node and tag can both be configured to establish and execute a bi-directional communication protocol in which both the node and the tag receive and respond to communications sent by the other. Regardless of the type of protocol established between the node and tag, in some embodiments, the tag may receive a unique identifier for a node that the tag has detected and may store the identifier. As such, the tag may know to which node the tag is in communication proximity and/or has been associated. Similarly, when implementing bi-directional communications, the node may receive a communication from a tag including a unique identifier of the tag, and the node may therefore know to which tags the node is associated with. Via these and other types of defined tag/node relationships, various functionalities, as mentioned above, may be implemented.

The structure and configuration of the configurable monitoring device described herein is such that, as indicated above, the configurable monitoring device may be employed with a plurality of other configurable monitoring devices to form a network. Within the network, each of the various configurable monitoring devices may have a different role based on the mode of operation or the current alterable configuration of each respective configurable monitoring device. Accordingly, after appreciating the structure and configuration of the configurable monitoring device, which imparts the dynamically configurable characteristic of the configurable monitoring device, various examples of network configurations and operational scenarios involving the configurable monitoring device may be better understood.

Figure 2:
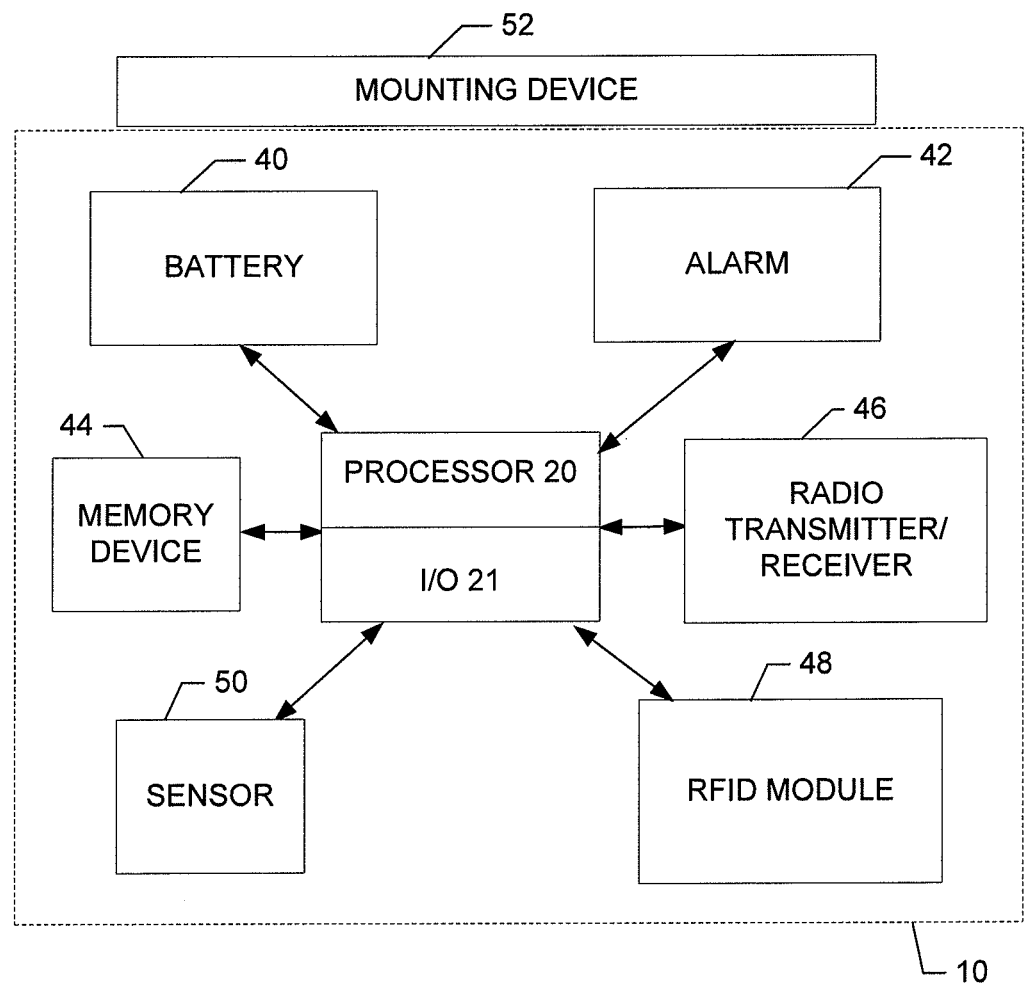
FIG. 2 is a block diagram of various physical components of the configurable monitoring device according to an exemplary embodiment of the present invention.

FIGS. 1 and 2 illustrate basic block diagrams of a configurable monitoring device 10 according to an exemplary embodiment. As shown in FIGS. 1 and 2, the configurable monitoring device 10 may include various components that support both basic operation of the configurable monitoring device 10 and operation of the configurable monitoring device 10 in any of its various configurable roles and/or modes. Some examples of these components are shown in FIGS. 1 and 2. However, it should be appreciated that some embodiments may include either more or less than the example components illustrated in FIGS. 1 and 2. Thus, the embodiments of FIGS. 1 and 2 are provided by way of example and not of limitation.

FIG. 1 is a block diagram showing various functional components of the configurable monitoring device 10 according to an exemplary embodiment. FIG. 2 is a block diagram of various physical components of the configurable monitoring device 10 according to an exemplary embodiment. Reference will now be made to both FIGS. 1 and 2 in order to describe an example structure and functional operation of the configurable monitoring device 10 according to an exemplary embodiment. In this regard, as shown in FIG. 1, the configurable monitoring device 10 may include a processor 20, input/output 21, and a communication interface 22. In some example embodiments, the processor 20 may be part of a Linux single board computer (SBC) and configured to support and execute a Structured Query Language (SQL) server. The processor 20 may in turn communicate with, control or embody (e.g., via operation in accordance with corresponding instructions) a configuration manager 24 and an alarm module 26. Meanwhile, as shown in FIG. 2, the configurable monitoring device 10 may include such physical components as the processor 20, a battery 40, an alarm 42, a memory device 44, a radio transmitter/receiver 46, and an RFID module 48. In some cases, the configurable monitoring device 10 may further include a sensor 50 and a mounting device 52.

In an exemplary embodiment, the processor 20 may be configured (e.g., via execution of stored instructions or operation in accordance with programmed instructions) to control the operation of the configurable monitoring device 10. The processor 20 may be embodied in a number of different ways. For example, the processor 20 may be embodied as one or more of various processing means or devices such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 20 may be configured to execute instructions stored in a memory device (e.g., memory device 44 of FIG. 2) or otherwise accessible to the processor 20. The instructions may be permanent (e.g., firmware) or modifiable (e.g., software) instructions. The instructions can be bundled or otherwise associated with other instructions in functional profiles, which can be saved as, e.g., an electronic file on one or more memory device (such as, e.g., memory device 44). Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to embodiments of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software or firmware instructions, the instructions may specifically configure the processor 20 to perform the algorithms and/or operations described herein when the instructions are executed. The processor 20 may include, among other things, a clock or any other type of timer, an arithmetic logic unit (ALU) and logic gates configured to support operation of the processor 20.

The processor 20 may also include input/output (I/O) 21 ports (or pins). Via configuration information, the I/O may be configured to interface with any number of external devices such as, electronic security devices, merchandising displays, equipment tags, employee identification cards, audio signal emitting devices (including alarms, speakers, piezo buzzer, etc), microphones, lights (e.g., light emitting diodes (LEDs) including dual-color LEDs), buttons, keypads, monitors, displays that presents human-readable information (e.g., for changeable pricing labels), sensors (e.g., accelerometers, movement sensors (e.g., jiggle switch), light sensors, temperature sensors, cameras, camera controls (e.g., configured to forward still pictures), security gates, store audio systems, customer counters, lighting switches, employee communicators (e.g., headsets, handheld radios), door strike mats, jewelry case mats, Lojack® devices, global positioning system (GPS) devices, barcode scanners, RFID readers, loyalty card scanners, communications hardware (e.g., USB hardware, Ethernet hardware, RS232 hardware), node devices, network entities (examples of which are discussed herein), and the like. As such, the I/O may be configured to support one or more roles that the configurable monitoring device may be configured to perform. For example, an I/O pin or port that is configured to interface with a light sensor may be used to determine whether a protected article has been placed under a coat or otherwise concealed. As another example, an I\O pin or port may interface with an LED to cause the LED to flash at a regular interval to provide a visual indication of the status of the configurable monitoring device and a deterrent to would-be thieves. For yet another example, an I\O pin or port may be configured to interface with a piezo buzzer or other audio device to play various tones by the processor 20. According to various example embodiments, actuation of the jiggle switch and detection of the actuation by the I/O may be a trigger event, which has a corresponding event indication signal, for the configurable monitoring device to transition from a sleep state to an awake state.

Via the I/O 21, which may be included with the processor 20, various functionalities may be triggered (including the transitioning of roles), based on the current role and the configuration information of the configurable monitoring device. Triggering may be initiated either at the configurable monitoring device level or at the system or monitoring terminal level. For example, the I/O pins or ports of a configurable monitoring device's processor may interface with a display for a price tag, when the configurable monitoring device is configured as a tag. Within the tag's configured role, for example, the price depicted on the display may be set to reduce at a given time. In some example embodiments, the time may be monitored by the processor of the tag and when the given time is reached, the processor may direct the I/O and the connected display to depict a reduced price. Alternatively, an example that includes triggering at the monitoring terminal level may include the time being monitored by the monitoring terminal, and the monitoring terminal may communicate a message including a reduced price, or an indication to reduce the price, to the tag at the given time to trigger the tag to reduce the price accordingly.

The memory device 44 may include, for example, one or more volatile and/or non-volatile memories. In other words, for example, the memory device 44 may be an electronic storage device (e.g., a computer-readable storage medium) comprising gates configured to store data (e.g., bits) that may be retrievable by a machine (e.g., a computing device including a processor such as processor 20). The memory device 44 may be configured to store information, data, applications, instructions or the like, which can be organized in any manner (including as various types of functionality profiles), that enable the configurable monitoring device 10 to carry out various functions in accordance with exemplary embodiments of the present invention. For example, the memory device 44 could be configured to buffer input data for processing by the processor 20. Additionally or alternatively, the memory device 44 could be configured to store instructions for execution by the processor 20.

The communication interface 22 may be any means such as a device or circuitry embodied in either hardware, software, or a combination of hardware and software that is configured to receive and/or transmit data from/to a network and/or any other device or module in communication with the configurable monitoring device 10. In this regard, the communication interface 22 may include, for example, an antenna (or multiple antennas) and supporting hardware and/or software for enabling communications with a wireless communication network 30 or other devices (e.g., other configurable monitoring devices). Additionally, to support network communications within the monitoring system, the communications interface 22 may support the implementation of a system-wide synchronized clock. Synchronization of the clock may be maintained via a clock signal. Configurable monitoring devices may include real time clock circuitry to support the synchronized clock and to regulate the use of precise communications windows.

In some environments, the communication interface 22 may alternatively or also support wired communication. For example, in some example embodiments, such as when the configurable monitoring device is configured to operate as a POS (point of sale) node, the communications interface may support wired communication via an RJ45 port. As such, for example, the communication interface 22 may include a communication modem and/or other hardware/software for supporting communication via cable, digital subscriber line (DSL), universal serial bus (USB) or other mechanisms.

In an exemplary embodiment, the communication interface 22 may support communication via one or more different communication protocols or methods. In some embodiments, the communication interface 22 may be configured to support relatively low power, low data rate communication, which may yield a relatively small communication proximity area. As such, for example, a low power and short range communication radio (e.g., radio transmitter/receiver 46) may be included in the communication interface 22. In some examples, the radio transmitter/receiver 46 may include a transmitter and corresponding receiver configured to support radio frequency (RF) communication in accordance with an IEEE (Institute of Electrical and Electronics Engineers) communication standard such as IEEE 802.15, which may yield a relatively larger communication proximity area. For example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 based communication techniques such as ZigBee or other low power, short range communication protocols such as a proprietary technique based on IEEE 802.15.4 may be employed. According to some example embodiments, the communications interface 22 may be configured to support an Internet Protocol version 6 (IPV6) stack.

The communications interface 22 may also support a Route Under MAC (Media Access Control) (RUM) protocol or a modified RUM protocol. Regardless of the protocol, the communications interface 22 may be configured to utilize a network identifier, for example stored in the memory device 44, such as a personal area network (PAN) identifier. In some example embodiments, a configurable monitoring device might not be permitted to communicate within the monitoring system without using a matching network identifier.

According to some example embodiments, a configurable monitoring device, or the monitoring system, may select a communications channel for use with monitoring system communications to implement a fixed channel scheme. A monitoring device may, based on the noise or channel traffic, select a quiet channel. However, a procedure may be implemented by the monitoring terminal and the configurable monitoring devices that provides for changing channels, for example, when a channel begins to operate poorly. According to some example embodiments, the monitoring terminal may communicate to the nodes to change channels, but the tags may perform a channel scan to determine the new channel.

In an exemplary embodiment, the communication interface 22 may additionally or alternatively be configured to support communication via radio frequency identification (RFID) or other short range communication techniques. As such, for example, the communication interface 22 may include RFID module 48. The RFID module 48 may include a modulator and demodulator to enable the RFID module 48 to interrogate RFID tags. Alternatively or additionally, the RFID module 48 may include one or more RFID tags.

In example embodiments where a configurable monitoring device 10 includes a radio transmitter/receiver 46 (e.g., an IEEE 802.15.4 radio) and an RFID module 48, the configurable monitoring device may be configured to operate as an interface that allows RFID devices to access a monitoring system. For example, an RFID reader or other RFID device, that does not include a configurable monitoring device, may communicate with a configurable monitoring device, such as a tag, and the configurable monitoring device may relay the communications to entities connected to the monitoring system. In the same manner, the tag may relay communications initiated on the monitoring system to an RFID device that has interfaced with a tag. As such, the configurable monitoring devices may operate as a gateway to the monitoring system for RFID communications.

The network 30 to which the communication interface 22 may connect (which may include the monitoring system) may be a local network (e.g., a WPAN) that may in some cases further connect to or otherwise communicate with a remote network on either a periodic or continuous basis. For example, via the communications interface 22, a configurable monitoring device may interface with external devices. Some examples of devices external to a configurable monitoring device include components and apparatuses of external EAS systems, RFID systems, closed circuit television systems, inventory systems, security systems, sales systems, shipping systems, point of sale terminals, advertising systems, marketing compliance systems, ordering systems, restocking systems, virtual deactivation systems, Lojack® systems, and the like.

The network 30 may include a collection of various different nodes, devices or functions that may be in communication with each other via corresponding wired and/or wireless interfaces. As such, the illustration of FIG. 1 should be understood to be an example of a broad view of the network and not an all inclusive or detailed view of the network 30. In some cases, the network 30 may be made up of a plurality of communication terminals (e.g., such as a plurality of configurable monitoring devices) in communication with each other via device-to-device communication to form a network. However, in other situations, the network may include a plurality of devices that each include an antenna or antennas for transmitting signals to and for receiving signals from a base site or access point, which could be, for example a base site or access point of a data network, such as a local area network (LAN), a metropolitan area network (MAN), and/or a wide area network (WAN), such as the Internet. In turn, other devices such as processing elements or devices (e.g., personal computers, server computers, displays, point of sale (POS) terminals and/or the like) may be coupled to the configurable monitoring device 10 via the network 30. By directly or indirectly connecting the configurable monitoring device 10 to various network devices and/or to other configurable monitoring devices via the network 30, the configurable monitoring device 10 may be enabled to dynamically receive indications of events (including triggering events, such as security events, and/or any other type of events) and/or configuration modifications (such as a functionality profile), and to perform various functions or tasks in connection with network devices or other configurable monitoring devices based on the current configuration of the configurable monitoring device 10.

As indicated above, the processor 20 of an exemplary embodiment may be embodied as, include or otherwise control the configuration manager 24 and/or the alarm module 26. The configuration manager 24 and the alarm module 26 may each be implemented by any means, such as a device or circuitry operating in accordance with firmware/software or otherwise embodied in hardware or a combination of hardware and firmware/software (e.g., processor 20 operating under software control, the processor 20 embodied as an ASIC or FPGA specifically configured to perform the operations described herein, or a combination thereof), thereby configuring the device or circuitry to perform the corresponding functions of the configuration manager 24 and/or the alarm module 26, respectively, as described herein. Thus, in examples in which software is employed, a device or circuitry (e.g., the processor 20 in one example) executing the software forms the structure associated with such means.

The configuration manager 24 may be configured to control operation of the configurable monitoring device 10 based on configuration information provided to the configurable monitoring device 10 (e.g., via the communication interface 22) or pre-stored in the configurable monitoring device 10. According to some example embodiments, the configuration manager 24, with the communications interface, may support a wireless bootloading. As such, for example, the configuration manager 24 may be configured to determine and/or control the configuration and thereby also the operation of the configurable monitoring device 10 based on the current situation as determined by the configuration manager 24 or based on the instructions received by the configuration manager 24.

Roles or configurations may be simple or complex based on, for example, the processing capabilities of the processor 20 and the memory storage of the memory device 44. In this regard, a configurable monitoring device may be configured to perform minimal data processing, and a monitoring terminal that coordinates and manages a monitoring system may be configured to perform incrementally more processing of data. Alternatively, some configurable monitoring devices may include relatively higher processing power and larger memory storage to support increased data processing at the configurable monitoring device, rather than at the monitoring terminal.

For example, in embodiments where a configurable monitoring device, configured as a tag, includes minimal storage memory, attribute information describing an article to which the tag is affixed may be stored at the monitoring terminal. When an inquiry device (e.g., price scanner, inventory scanner) requests the attribute information from the tag, the tag may communicate the request to the monitoring terminal, and the monitoring terminal may provide the attribute information to the inquiry device, either through the monitoring system or through a connection external to the monitoring system.

Alternatively, in embodiments where memory device 44 includes a relatively large storage memory, attribute information describing the article to which a tag is affixed may be stored local to the tag, within the memory device 44. When an inquiry device (e.g., price scanner, inventory scanner) requests the attribute information from the tag, the tag may directly communicate, or initiate the communication of, the attribute information from the tag to the inquiry device.

A configurable monitoring device may also be configured by being provided configuration information via physical connection to a configuring device, such as a monitoring terminal. The physical connection may support the transmission of electrical signals between the configuring device and the configurable monitoring device. Alternatively, if wireless configuring of configurable monitoring devices is to be utilized to configure a plurality of devices, according to some example embodiments, the power of the signals including the configuration information may be precisely set, so as not to configure configurable monitoring devices that were not intended to be configured.

After being initially configured, the configurable monitoring device 10 may be considered to be "commissioned". In this regard, commissioning of the configurable monitoring device 10 may include providing the configurable monitoring device 10 with an initial configuration as defined by its initial assigned role/mode. However, in some instances, an already configured device may be transitioned into a different role by modifying existing configuration information, replacing the existing configuration information, and/or providing additional hardware in communication with the configurable monitoring device 10 to add further functional capabilities, and/or guidance for operation. For example, after being commissioned as a tag, the configurable monitoring device 10 can receive a triggering event and enter its triggered role, a ping mode. In response to receiving a second triggering event, the configurable monitoring device 10 can transition into a second triggered role, which may be the initial configuration role (e.g., a tag role) or any other role (e.g., gate node role). Additionally, the received indication of the triggering event can be targeted at the configurable monitoring device 10, even when a plurality of monitoring devices may have received the indication of the triggering event(s). For example, the indication can be physically directed to the configurable monitoring device 10 (using, e.g., a directional antenna) or electrically directed to the configurable monitoring device 10 (by, e.g., integrating an identifier unique to the configurable monitoring device 10 into the indication). The commissioning/transitioning process (sometimes referred to herein as "the commissioning process"), which may be handled internally by the configuration manager 24, may include providing the configurable monitoring device 10 with configuration information or identifying configuration information (e.g., pre-stored configuration information) to be employed. However, in some cases, the commissioning process may further include providing the configurable monitoring device 10 with information directing changes to an already existing configuration of the configurable monitoring device 10. This may occur, for example, when a commissioned configurable monitoring device is to be re-tasked or transitioned for use with another product rather than being decommissioned. In such a situation, since there is already existing information that is changed, the operation of changing the existing configuration may be viewed as re-commissioning or transitioning. The commissioning, transitioning or re-commissioning may be accomplished via wireless instructions received by the communication interface. Commissioning and/or transitioning may also be provided via scanning of an RFID tag, reading a barcode, adding specialized hardware, bringing the configurable monitoring device 10 into proximity of specialized hardware, and/or receiving any other type of indication corresponding with a another type of triggering event.

In some example embodiments, a configurable monitoring device may be first configured as a tag, and the tag may then be commissioned. To commission a tag, the following example procedure may be undertaken. The tag may be first affixed to an article and then experience a triggering event, such as the tag being brought into close proximity to a commissioning node. The commissioning node may communicate an indication of the triggering event directly with the tag via wireless communications when the tag is brought into range (e.g., communication proximity) of the commissioning node. While the tag is within range of the commissioning node, a barcode scanner connected to the commissioning node may be used to scan the barcode of the article to which the tag is affixed. By scanning the barcode, a barcode to tag relationship may be defined. Having generated the tag/barcode relationship, the tag may be considered commissioned. The tag/barcode relationship may be stored on the tag and/or on memory storage accessible to a monitoring terminal that oversees the operation of the monitoring system. Upon being commissioned, the tag may be configured to confirm the proper commissioning by generating an audible sound, such as two beeps.

While commissioned, the configurable monitoring device 10 may continue to receive instructions (e.g., via the communication interface 22) or other information (such as, e.g., other indications of other events) useful for making determinations as to the configuration to be employed and the corresponding role/mode of operation to assume. However, in some cases, information useful for making determinations regarding configuration changes (e.g., mode and/or role transitions) may be made responsive to activity or other triggering events that may be sensed internally (e.g., via sensor 50 of FIG. 2 or otherwise determined locally within the dynamically configurable monitoring device 10). For example, the dynamically configurable monitoring device 10 may be able to determine that its mounting device has been tampered with or removed without authorization from its assigned article.

Decommissioning of the configurable monitoring device 10, which may also be handled by the configuration manager 24, may include powering down the configurable monitoring device 10, clearing or resetting configuration information, or directing the configurable monitoring device 10 to enter an idle or non-transmitting mode in order to conserve battery power until the configurable monitoring device 10 is re-commissioned. The configurable monitoring device 10 may be decommissioned by instructions received via the communication interface 22 (e.g., via a software or coded key) or by manual activity taken by a user (e.g., with a physical key). Upon being decommissioned, a tag may enter a forever sleep mode, until, for example, a switch on the tag is actuated by a user or other triggering event occurs that causes an indication of the triggering event to be received.

According to some example embodiments, a battery check may be performed by the processor 20 of a configurable monitoring device configured as a tag during decommissioning. In this regard, the tag may include the hardware and software (e.g., processor configured by instructions) to provide for monitoring the battery charge level. If the battery charge level for a tag has fallen below a given threshold, the tag may alarm or otherwise indicate to the store personnel that the tag should be removed from service for recharging or battery replacement. Tags that have battery levels above the given threshold may be decommissioned and identified as being available for re-commissioning. According to some example embodiments, a tag having a battery level that has fallen below a given threshold may be prevented from being re-commissioned until the battery charge level is sufficient improved. In this manner, the situation where a tag's battery discharged while the tag is not sales floor can be minimized or avoided.

The following provides an example procedure for a configurable monitoring device that is configured as a tag from manufacturing to decommissioning. When the configurable monitoring device is manufactured, the configurable monitoring device may be provided configuration information to configure the configurable monitoring device as a tag. The tag may initially be decommissioned and placed in an inactive state. In the inactive state the tag may be configured to sleep indefinitely. However, if a certain type of trigger event occurs (such as, e.g., an unlock event occurs, such as the opening of a cable lock security device), the tag may awaken and be prepared for commissioning.

When the tag awakens, the tag may provide feedback to a user in the form a of a beep noise. The tag may be configured to return to an inactive state in the event that another type of trigger event (e.g., movement of the tag as indicated by a jiggle switch) is not detected for a period of time. For example, after five minutes of no detected movement, the tag may return to the inactive state. If motion and/or other type of trigger event commences or continues, the tag may be placed in the awake state and a fast LED blink may be provided as an indicator of the awake state. In the awake state, the tag may be configured to receive signals or listen to a communications channel designated for commissioning tags. A commissioning node (or hub) may transmit signals on the commissioning channel. In this regard, the commissioning node may be a configurable monitoring device configured to transmit a low power commissioning query every so often (e.g., every 100 ms). The tag may be configured to return to the inactive (or sleep) state, if the tag fails to receive a certain type of trigger event (such as, e.g., commissioning query) within a predetermined amount of time (e.g., 500 ms). In some example embodiments, a commissioning query may be accepted by the tag only if the received indication's signal strength is greater than a certain threshold level (e.g., 90 percent of the level set for proper signal reception).

During the commissioning process, the tag may be provided a Tag ID, a Network ID, a communications channel, and the like, by the commissioning node. The tag may also be associated with a SKU of the article to which the tag is or will be affixed. An anti-tamper mechanism may also be armed, and the tag may provide a beep or a squawk if a certain trigger event does not occur (e.g., the tag is not armed) within a threshold period of time after having been associated with a SKU (e.g., 5 seconds). Once the anti-tamper and security mechanism is armed, the tag may be set to a seek and clock synchronization state, or the seek_sync state.

In the seek_sync state, the tag may be configured to seek out, and associate itself with a ping node and/or a communications node. The tag may also be configured to blink an LED to indicate an armed status and as a theft deterrent. Until a communications node and/or a ping node is found, the tag may be configured to beep, for example, every 30 seconds. The tag may also be configured to stay in a communications receive mode until the tag receives a signal from a node. Upon receiving a signal from, for example, a communications node, the tag may perform a sync operation to synchronize the tag's clock with the system clock. Having synchronized the tag's clock, the tag may identify communications frames or windows that are for use by the tag for subsequent communications, either receiving or transmitting, and the tag may be placed in the sleep state between the windows.

Having identified and interacted with at least one node, the tag may subsequently enter a seek_closest node state, where the tag determines the node (e.g., ping node) that the tag may associate itself with from a location perspective. In the seek_closest state, the tag may blink an LED every 1 second, and scan a complete communications frame for the node providing the strongest signal and store a node ID (sometimes referred to herein as a node identifier), possibly taken from the ping or other signal, of the node. The tag may also be configured to store the node ID of the second strongest ping or other node signal.

Upon determining the ID of the node with the strongest signal, the tag may register with the node to indicate that the tag is positionally related to the node, thereby enabling the node ID to be a form of location information. In response, the node may provide, and the tag may receive an acknowledgment of the registration. Upon receiving the acknowledgement the tag may store the node ID in a manner that indicates that the tag is registered with the node. The tag may then transition into a home state. The node may store the registration information provided by the tag. The node may transmit the tag/node relationship information to the monitoring terminal during a later frame for communications with the system coordinator or the monitoring terminal. The node may store the tag association information in a temporary or overwritten memory, and the monitoring terminal may maintain a record of the tag/node association. If a tag fails to receive a signal from a node for a threshold number of frame cycles (e.g., 2 frame cycles), the tag may determine it is experiencing an alarm event, its processor may receive alarm information and/or the tag can be configured to go into an alarm state.

In the home state, a tag may be located on a shelf within a sales environment. The tag may be configured to regularly blink an LED, such as every 5 seconds. At regular or irregular intervals, such as once an hour, the tag may be configured to wake and transmit an inventory record in, for example, a frame for communications with the monitoring terminal. The inventory record may include the ID of the tag, the current time, the period of active time for the tag, the tag's battery level, a handle count (indicating the number of times the article to which the tag is affixed has been handled), a time last handled, a current node ID, the time that the tag acquired the current node, and a previous node ID.

From the home state, the tag may enter a vigil state when a trigger event, e.g., motion, is detected (e.g., via the internal motion detector). In the vigil state, the tag may be configured to regularly blink an LED, such as every 5 seconds. Since the tag entered the vigil state because there is a potential of another trigger event occurring (e.g., movement of the tag to a location closer to another node), the tag may be configured to scan and verify that signals received from the currently associated node remain stronger than signals being received from, for example, a node previously identified as having a second strongest signal strength. If the currently associated node is no longer providing the strongest signal, the tag may enter the seek_closest state described above. If the strongest power signal is coming from a gate node, the tag may be configured to verify that the gate node signal is not more than a first gate threshold. If the strength of the gate node's signal is stronger than the first gate threshold, the tag may enter the near_gate state.

In the near_gate state, the tag may be configured to chirp and blink an LED at a regular, but faster, interval, such as every 1 second. The tag may also be configured to transmit, possibly multicast, a first alert message. The gate node may also be configured to activate an audio device and emit an audible chirp in response to the tag being sufficiently within range of the gate. The tag may continue to check the signal strength of the gate node, and if the signal strength of the gate node passes a second gate threshold, the tag may interpret that as an alarm event and transfer into the alarm state consistent with its functionality profile.

Regardless of the current state, if an alarm event occurs (e.g., the security mechanism is tampered with, such as with a cable or case breach), the tag may receive an alarm indication and enter the alarm state. As used herein, an alarm event is similar to or a type of triggering event associated with an alarm event, and an alarm indication is similar to or a type of indication that produces an alarm response at the monitoring device and/or a network entity. For example, the tag can include an internal tamper detection component that can be coupled to processor 20 via input/output 21.

When tag is in the alarm state, the tag may be configured to blink an LED at a fast rate. The tag may also be configured to sound the alarm on the device and transmit, such as multicast, an alarm message to the node during, for example, a frame for a node. For example, the alarm message may be sent periodically or when possible, such as every 5 seconds, to the current node, and the node may sound an alarm local to the node or a remote alarm. During the alarm state, the signal strength of the nodes may be monitored to determine if the tag has experience another trigger event, such as, for example, moved away from a gate node and, in response, transition into a home or vigil state consistent with it's functionality profile.

Further, to decommission a tag, for example at a POS, a tag may receive a decommission signal form the POS node in the frame or slot of the POS hub. The tag may subsequently provide an acknowledgment, and the tag may enter the inactive state.

Accordingly, the configurable monitoring device 10 may be dynamically configurable via wireless instructions to alter the operating mode of the configurable monitoring device 10 and thereby also modify the role of the configurable monitoring device 10 in its network environment. The different configurations that are available at the configurable monitoring device 10 may be changed dynamically as well and may be managed by the configuration manager 24. Thus, the configuration manager 24 (e.g., via execution of stored instructions by the processor 20) may provide control over the operation of the configurable monitoring device 10 based on the configuration information stored and/or received at the configurable monitoring device 10 and, in some cases, also or alternatively based on local conditions sensed internally by the configurable monitoring device 10.

Some configurations in which the configurable monitoring device 10 operates may specify specific alarm conditions to be triggered. As such, when alarm conditions are triggered based on the current configuration, the configuration manager 24 may communicate with the alarm module 26 to manage alarm function of the alarm 42. The alarm 42 may be configured to produce an output, typically in the form of sound energy, although light, vibration or other outputs are also possible. As such, the alarm 42 may include an output device such as one or more of a speaker, vibration pack, light (e.g., a light emitting diode (LED)) or other device. The alarm module 26 may be configured to control operation of the alarm 42 based on instructions received from the configuration manager 24. In this regard, based on the current configuration of the configurable monitoring device 10 as determined by the configuration manager 24, an alarm condition may be identified and signaled to the alarm module 26. In some embodiments, the alarm condition may be associated with a predetermined alarm signal, which the alarm module 26 may be configured to provide to the alarm 42 to direct an output. The alarm 42 may be configured to provide any number of different outputs in response to the alarm signal including but not limited to a tone or series of tones, a ringing noise, a recorded or synthetic voice output, a solid or flashing light with any of various predetermined flash sequences, a vibration that is either continuous or pulsed with various different pulse sequences, or various other outputs or combinations of the above and/or other outputs.

In some embodiments, the alarm module 26 may provide alarm responses that are not necessarily just audible, light or mechanical vibration outputs. In this regard, for example, the alarm module 26 may be configured to further provide alerts to monitoring devices (e.g., an alarm panel, a network monitoring server or computer and/or a local computer or server). The alerts may be text alerts describing a corresponding situation that triggered the alert. However, in other cases, the alerts may go to an alarm panel to be indicated by pre-configured light sequences, etc. As such, for example, when certain events (e.g., conditions and/or stimuli) are encountered or received, the alarm module 26 may be configured to provide an alert command that may produce an output that can be reviewed and either acted upon or noted and cleared by monitoring or management personnel. In some embodiments, the alerts may be routine alerts such as maintenance warnings, low battery indications, or other network or system related alerts. However, the alerts could also have a marketing purpose in some embodiments. In this regard, specific activity may trigger an alert to a customer that a related item is on sale, trigger asking the customer whether a particular type of assistance may be offered, or may trigger an identification of a matching item and its location via a video display proximate to the product being inspected by a customer and including the configurable monitoring tag.

In an exemplary embodiment, the alarm module 26 may merely direct, for all alarm conditions, a single response (e.g., one of the above listed alarm outputs). However, in an exemplary embodiment, the alarm response generated by the alarm 42 may vary based on the current situation. Thus, for example, the configuration manager 24 may provide the alarm module 26 with information identifying a specific alarm response (e.g., a selected one or combination of the above listed possible alarm outputs) to be provided based on the current mode of operation of the configurable monitoring device 10. In some cases, the identified specific alarm response identified may be identified based at least in part on current conditions associated with the current mode of operation. Thus, for example, the current mode of operation may define no alarm response unless a specific stimulus is encountered. In response to the stimulus being encountered locally (e.g., via information provided by the sensor 50) or remotely (e.g., via information provided through the communication interface 22), the configuration manager 24 may signal the alarm module 26 to select an appropriate alarm response. The alarm 42 may therefore be employed for a variety of reasons due to the flexibility associated with the alarms that may be provided and the conditional awareness associated with generation of the alarm responses. For example, the alarm 42 may be used to identify product location for a product near the configurable monitoring device 10 or a product to which the configurable monitoring device 10 is affixed. Alternatively, the alarm 42 may be used to signal a potential theft situation or even the presence (e.g., within communication proximity) of another configurable monitoring device that may be in the process of being stolen, tracked, or located.

The sensor 50 may be an optional device added into or plugged into the configurable monitoring device 10 in some situations (e.g., including optional hardware that can be integrated into and/or placed in operable communication with the configurable monitoring device 10). In this regard, the sensor 50 could be used for making determinations of local conditions at the configurable monitoring device 10. The sensor 50 could be embodied as any of various sensing devices configured to detect motion, light, images, sound, tampering, or other environmental stimuli. As such, the sensor 50 may include a light detector, an optical scanner, a motion detector or other sensing devices. In an exemplary embodiment, the sensor 50 may be configured to detect a particular indicia of attempts to tamper with and/or remove the configurable monitoring device 10 from a product to which the configurable monitoring device 10 is affixed or of other attempts to steal the product. As such, for example, if a particular type of product to which the configurable monitoring device 10 is affixed is typically susceptible to handling in a specific manner by thieves attempting to conceal the product being stolen, remove the configurable monitoring device 10 from the product, or damage the product, the sensor 50 may be configured to sense indicia of the corresponding handling. Thus, for example, in response to the configurable monitoring device 10 being in a theft deterrent related mode when the indicia of the corresponding handling indicative of improper activity is received, the sensor 50 may provide a signal to the configuration manager 24 to indicate the current conditions to enable the configuration manager 24 to alter the operation of the configurable monitoring device 10 accordingly (e.g., by instructing the alarm module 26 to generate an alarm response at the alarm 42 that is indicative of the respective improper activity). In some embodiments, when a monitoring device has transitioned from a tag to a node, but is still attached to an article, the tag can automatically transition back to tag mode in response to detecting tampering, potential theft, or other type of triggering event and enter an alarm state if necessary.

The battery 40 may be any type of battery or battery pack that provides sufficient power to permit extended operation of the configurable monitoring device 10. The battery 40 may be rechargeable or replaceable and may be of any suitable size. In some embodiments, the battery 40 may have terminals that extend from a casing or housing of the configurable monitoring device 10 to enable the configurable monitoring device 10 to be placed on a charging stand. In some situations, a single or multiple element charging stand may be provided to enable out of service (or some in service) configurable monitoring devices to be recharged. The terminals may also enable wired communication with the configuration manager 24 to enable the provision of configuration information to the configurable monitoring device 10 via the charging stand while the battery 40 is being charged or otherwise when the configurable monitoring device 10 is being commissioned, re-commissioned or even while the configurable monitoring device 10 is decommissioned. In some example embodiments, such as when the configurable monitoring device is configured to operate as a stationary node, a configurable monitoring device may alternatively, or additionally, include a mains power connection for powering the configurable monitoring device.

As indicated above, the configurable monitoring device 10 may, in some cases, operate in a tag mode (sometimes referred to herein as the "tag role"). When operating in a tag mode, it may often be desirable for the configurable monitoring device 10 to be affixed to a particular product or other type of article. When operating in node mode (sometimes referred to herein as the "node role"), it may be desirable for the configurable monitoring device 10 to be disposed at a centralized location relatively near to a plurality of tags or otherwise strategically located at a selected location to facilitate communication with and/or information extraction from tags. However, exceptions to the situations described above are permissible and may in fact be common in many exemplary architectures employing embodiments of the present invention. In any case, the configurable monitoring device 10 may include a mounting device 52 to facilitate placement of the configurable monitoring device 10.

In situations where the configurable monitoring device 10 is affixed to a product or retail article, the mounting device 52 may be configured to be tailored to providing an appropriate mechanism of affixing the configurable monitoring device 10 to the corresponding product. As such, for example, in some situations, an adhesive, snap fastener, clip, clasp, tether, hook-and-loop fastener, magnetic fastener, pin connector, or other fastening device enabling direct connection of the configurable monitoring device 10 to the corresponding product may be provided as the mounting device 52. One such mounting device may be configured to attach to the shaft of a golf club or similar article such as the device disclosed in U.S. Pat. No. 7,266,979 herein incorporated by reference in its entirety. Other such mounting devices may be configured to attach to a bottle neck or a bottle cap such as the devices disclosed in U.S. Pat. Nos. 7,259,674 and 7,007,523, both herein incorporated by reference in their entirety. Still other mounting devices may be configured to attach through a product such as an article of clothing or a blister pack such as the hard-tag disclosed in U.S. Pat. No. 6,920,769 incorporated herein by reference in its entirety. Each of the aforementioned patents is commonly owned by the assignee of the present application.

However, in other situations, some products may not be suitable for direct attachment to the product. For example, while a product such as a golf club, bottle, shoe or article of clothing may be suitable for the attachment via direct connection thereto, articles that are sold in a packaging box are often less suitable for such attachment. In this regard, packaging boxes may be opened and the article therein may then be stolen without the box. Moreover, it may not be practical or desirable to open packaging in order to directly connect the configurable monitoring device 10 to the product. Accordingly, in some embodiments, the mounting device 52 may actually be a wrap such as Alpha Security Products' Spider Wrap™ disclosed in U.S. Pat. No. 7,162,899 herein incorporated by reference in its entirety. Further, a cable lock, such as the Alpha Security Products' Cablelok™ device disclosed in U.S. Pat. No. 7,249,401 or a keeper, such as that disclosed in U.S. Pat. No. 6,832,498 may include the configurable monitoring device 10. Each of the aforementioned patents being commonly owned by the assignee of the present application and herein incorporated by reference in their entirety. The wrap may be particularly useful in connection with six-sided box packaging for larger articles. The enclosure (or keeper) may be particularly useful for smaller articles such as CDs, DVDs, bottles, tubes or other containers of health, beauty and/or other products.

Depending on the type of mounting device 52, a configurable monitoring device configured as a tag may be configured to operate differently. For example, a hard tag may be armed to alarm by insertion of a pin to activate or arm the alarm. The hard tag may then alarm when the pin is violated. A CableLok™ device may be armed in response to a bayonet being inserted and the continuity of the bayonet may be monitored such that the device is configured to alarm in response to the bayonet being cut and the continuity being disrupted. SpiderWraps™ may also alarm in response to a cable being cut. Keepers may arm via a slide switch and may alarm in response to the lid of the keeper being violated.

In some applications, the mounting device 52 may be unlockable by the implementation of a key and/or network entity. The key may be embodied in many different ways. In this regard, in some situations, the key may be a specially formed device that mates mechanically with some portion of the mounting device 52 in order to disable a locking mechanism of the mounting device 52. As an alternative, the key may be a magnetic device configured to interface with a locking mechanism of the mounting device 52 to enable the mounting device 52 to be unlocked to permit removal of the mounting device 52 from the corresponding product to which the mounting device 52 is affixed. As yet another alternative, the key may actually include an electrical component for exchanging signals or information with the mounting device 52 to enable unlocking of the mounting device 52. As such, for example, the key could be an embodiment of the configurable monitoring device 10 that is provided with specific configuration information defining functionality for the configurable monitoring device 10 to function as the key for unlocking the mounting devices of other configurable monitoring devices. In such implementations, the key (or the configuration information associated with the key) may include a software component or code that is unique to a particular individual (e.g., a specific manager or assistant manager). Furthermore, the configurable monitoring device 10 configured to function as a key may report unlocking activities and/or other information regarding other devices encountered or activities undertaken to a local or remote database so that activity of the key may be monitored. Additionally, authenticity of the code may be defined or verified so that, for example, if a particular manager's key is lost or a manager leaves, the corresponding code for the manager's key may be invalidated so that further unlocking operations with the manager's key may not be possible. In addition to or as an alternative to unlocking mounting devices, the key may be useful for setting an alarm or turning an alarm on or off.

In some embodiments, the sensor 50 may be a portion of or otherwise positioned to monitor activity with respect to the mounting device 52. Thus, for example, the sensor 50 may be configured to determine whether the enclosure is opened or the wrap is cut, stretched, mutilated or otherwise damaged. The sensor 50 may alternatively be configured to determine whether the mounting device 52 is removed from the corresponding product to which the mounting device 52 was attached. Accordingly, in response to the sensor 50 detecting attempts to remove the configurable monitoring device 10 from the product, the sensor 50 may provide an indication to the configuration manager 24 (e.g., via the processor 20) and the configuration manager 24 may take appropriate action (e.g., change the mode of operation of the configurable monitoring device 10 or signal the alarm module 26 to issue an alarm response, and/or the like).

As indicated above, the mounting device 52 may, in some cases, not attach the configurable monitoring device 10 to a product. As such, the mounting device 52 may alternatively comprise a stand, base or other support for enabling the positioning of the configurable monitoring device 10 in a desirable location. In some situations, the mounting device 52 may include an adhesive or other mechanism for attaching the configurable monitoring device 10 to a surface such as a ceiling, floor, desk, display case, table, platform, door, door jamb, vehicle, or other structure. When mounted to such structures, the configurable monitoring device 10 may often be operated in a node (router), hub or gateway mode. In an exemplary embodiment, by providing a configurable monitoring device on each door jamb of a building exit, the configurable monitoring devices on each side of the door jamb may form an EAS gate.

In various embodiments, the configurable monitoring device 10 may operate in any of various different modes and therefore perform any of various corresponding roles. Some examples of some of these modes will be described in greater detail below. Multi-modal operation of the configurable monitoring device 10 may, in some cases, extend to relatively broad classifications that relate to corresponding operational roles of the configurable monitoring device 10. For example, in some situations, the configurable monitoring device 10 may, in response to an indication of a triggering event or otherwise, be dynamically configured to operate in accordance with roles defined for a security mode, a marketing mode, an inventory management mode, and/or the like. Furthermore, each mode may include sub-modes. For example, some examples of sub-modes of operation may include a tag mode or node mode, each with a corresponding role of acting as a tag or a node, respectively. Some embodiments may permit definition of additional sub-modes and corresponding roles such as, for example, operation as a hub or gateway. However, in alternative embodiments, tag mode, node mode and other modes of operation may themselves be primary modes of operation and not necessarily sub-modes.

Figure 3:
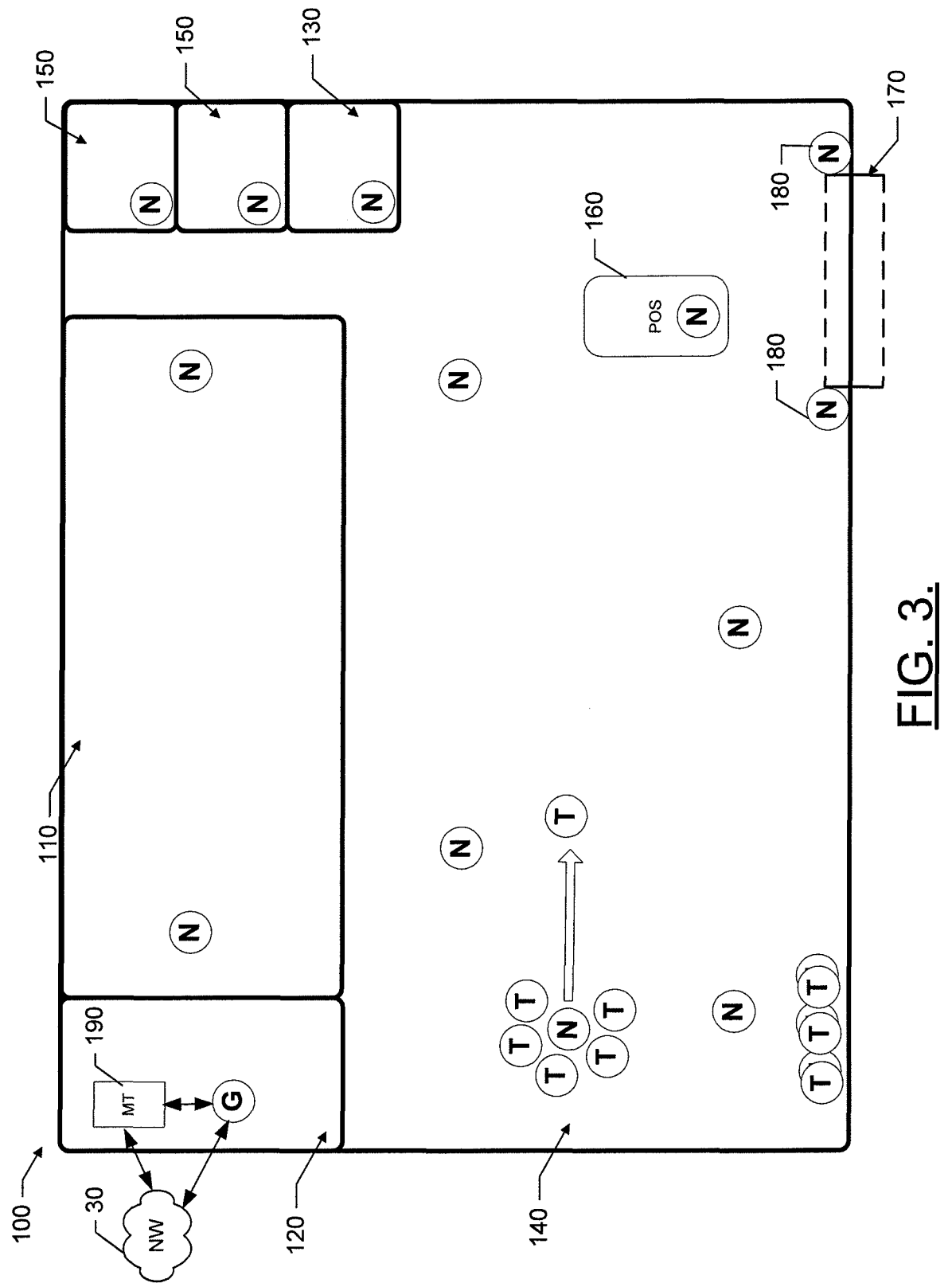
FIG. 3 illustrates a diagram of various configurable monitoring devices configured to define a network in accordance with an exemplary embodiment of the present invention.

FIG. 3 illustrates a diagram of various configurable monitoring devices configured to define a network, such as mesh network, star network, hybrid mesh/star network, or the like, to help illustrate the flexible nature of the configurable monitoring device 10 with respect to dynamic configuration and employment thereof. In this regard, FIG. 3 depicts an exemplary retail environment 100 including a stock room 110 where excess inventory is maintained, an office space 120 from which monitoring activity may be coordinated or otherwise viewed, fitting rooms 130 in which articles of clothing may be tried on by potential buyers, a retail floor 140 on which various products may be displayed or otherwise made available for buyers to purchase and restrooms 150. FIG. 3 also depicts a point of sale (POS) terminal 160 at which payment may be made for products and a door 170 through which customers may enter and exit the retail floor 140. Notably, FIG. 3 is not drawn to scale, but is merely provided to illustrate an example of the some of the concepts described herein.

Various different products may each be provided with a corresponding configurable monitoring device. Furthermore, several other configurable monitoring devices may be provided at various locations throughout the retail environment. During commissioning, at least some of the configurable monitoring devices that are affixed to products may be configured to operate in a tag mode. Several configurable monitoring devices operating in tag mode are illustrated in FIG. 3 as circles with the letter "T" therein. Some other configurable monitoring devices may be configured during commissioning and/or transitioning to operate in node mode. Examples of configurable monitoring devices operating in node mode are shown in FIG. 3 as circles with the letter "N" therein. Still others (or a single configurable monitoring device) may be configured to operate as gates or in a hub or gateway mode. For purposes of explanation, a configurable monitoring device configured to operate in node mode will be hereinafter referred to as a "node", a configurable monitoring device configured to operate in tag mode will be referred to as a "tag", a configurable monitoring device configured to operate in gateway mode will be referred to as a "gateway" (e.g., a configurable monitoring device signified with a circle having the letter "G" therein), and a configurable monitoring device configured to operate as a gate will be referred to as a "gate node".

In the example of FIG. 3, tags may be distributed at various locations throughout the retail floor 140. In some cases, products in the stock room 110 may not be provided with corresponding configurable monitoring devices until they are commissioned and placed on the retail floor 140. However, in alternative embodiments, configurable monitoring devices could also be provided on items in stock, but not yet on display on the retail floor 140. As is shown in FIG. 3, the products (and therefore the corresponding tags) may be provided in certain display areas and therefore congregated accordingly. In such situations, a node may be placed proximate to the display area to facilitate communication with the corresponding tags. The nodes may therefore enable proximate communications with nearby tags, detection of the presence of nearby tags, tracking of nearby tags, relaying configuration information to tags or other nodes, and carry out other functions. Nodes may also be provided at various other strategic locations in order to detect the presence of tags. In this regard, for example, a node may be placed in the fitting rooms 130, in the restrooms 150, the stock room 110 or other locations in which the presence of a tag (and its corresponding product) should be noted, monitored or tracked. Nodes may also be randomly placed throughout the retail floor 140 or placed at regular intervals to provide substantially complete coverage of the retail floor 140 and any other spaces of the retail environment 100 that may be desirable for monitoring.

During commissioning and/or transitioning, each tag may be provided with configuration information that defines the corresponding tag's role (e.g., as a tag) and/or mode. The configuration information may also define a communication paradigm for the tag. For example, the communication paradigm may define sleep periods and wake periods to manage battery power consumption. The communication paradigm may also or alternatively define a heartbeat or check-in frequency with which the tag is to communicate with the node on a routine basis to establish whether the tag remains active or has undergone a status change. The communication paradigm may also define a frequency with which the tag may provide information to and/or receive information from nodes based on the current mode of operation.

In some embodiments, during commissioning and/or transitioning, each tag may also be provided with product information regarding the product to which the tag is affixed and, in some cases, product or marketing information about the product and/or related items. The product information and/or marketing information may be communicated to the nearest node or a predetermined node for implementation of functionality associated therewith. The communication of the information to a node may be triggered based on the configuration and/or transitioning of the tag. For example, some tags may be configured to execute a programmed functionality in response to a triggering event (such as, e.g., movement of the tag as sensed by the tag itself, or by other tags or a nearby node). The movement or other type of trigger event required to generate associated indication, which the tag's processor receives, and thereby trigger a functionality could be set relative to a threshold (e.g., picking an item up, moving an item more than a predetermined distance, moving the item to a particular location, etc.). Functionalities that may be provided include, among other things, the presentation of product or marketing information at a display that may be positioned nearby the tagged items location and/or the identification of a matching item or an item that may be of interest in combination with a selected item, the presentation of a picture of the customer with a message specific to the customer, the initiation of tracking of the tag, the initiation of mode changes for the tag, the node or surrounding tags, the generation of an alarm response, etc. Additionally or alternatively, information about similar items in different price ranges may be provided.

During commissioning and/or transitioning, nodes may be provided with corresponding configuration information and/ or a communication paradigm as well. The configuration information and communication paradigm of the node may be different in terms of specific values and instructions, but in general terms, may be similar to the information provided to the tags and described above. Nodes may also be provided with information that may enable and, in fact, direct communication of information to external devices (e.g., a display, automatic doors, a remote camera) or to other nodes or tags. Thus, in some situations, nodes may be configured to provide configuration information to tags, to track tags, to de-commission tags, to commission tags, to generate an alarm response themselves or direct other devices to generate alarm responses and/or the like.

Nodes may be configured to track or otherwise monitor or communicate with not only tags associated with other configurable monitoring devices, but also other conventional tags. Thus, for example, as described above, since the nodes may include an RFID module, nodes may also interface with conventional RFID tags for reading, tracking, and other purposes. Additionally, since some nodes may act in an EAS gate capacity (described further below), nodes of embodiments of the present invention may also be configured to interface with conventional EAS tags. Nodes may act as routers of data and/or configuration information between tags of various kinds and a central monitoring terminal. As such, in some instances, nodes may be distributors of configuration information either as a pass through device through which configuration information is routed, or by passing locally stored configuration information on to another configurable monitoring device.

In an exemplary embodiment, specially configured nodes may be located at the POS terminal 160 for de-commissioning tags when an item is purchased and/or for obtaining information regarding the sale for recordation (e.g., product information). In some cases, the node at the POS terminal 160 may also include a key for unlocking the mounting device 52 after payment has been received, similar to the manager's key described above. The tag may therefore be removed for use and subsequent commissioning with another item. The POS terminal 160 may therefore deactivate tags for purchased items prior to such tags being passed between nodes configured in an EAS gate configuration. In this regard, for example, some configurable monitoring devices may be configured as gate nodes and may be located at a doorway (e.g., door 170) to monitor for tags passing through the door. In response to an active tag passing between nodes (as determined by, e.g., the active tag receiving the identifiers embedded in the gate nodes' ping signals) acting in an EAS configuration as gate nodes, the corresponding nodes (e.g., nodes 180 of FIG. 3) may report information to a database or other network entity, drive a display, camera or other external device, or generate an indication of an alarm event, thereby causing an alarm response. Accordingly, by deactivating tags of purchased items, an inappropriate alarm may be avoided. However, in other cases, the node at the POS terminal 160 may merely reconfigure the tag of a purchased item to enable the tag to be monitored as it leaves the retail environment 100 without setting off an alarm.

The nodes may be configured to establish bi-directional communications to communicate with each other, with tags and/or with a gateway node (G) or hub, and/or with one or more displays, databases or other external devices. In an exemplary embodiment, the gateway node (G) may serve as aggregation point or interface point for the presentation of information within the network or other network defined to monitor the retail environment 100 and external devices and/ or networks. As such, for example, the gateway node (G) may include a network interface for providing information to, for example, a cellular network or the Internet. In the example of FIG. 3, the gateway node (G) is shown in communication with the network 30.

In addition or as an alternative, the gateway node (G) may be in communication with a monitoring terminal (MT) 190. The monitoring terminal 190 may be a computing device such as a laptop, PC, server or other terminal to which information exchanged within the network is reported and from which information may be received. In some embodiments, the monitoring terminal 190 may include a database and/or other information recording devices configured to record activity reported by the nodes. For example, movement of tags, product and/or marketing information received from tags or provided responsive to movement of tags, tag position and/or position history, mode changes, configuration changes and other information may be recorded for monitoring by store personnel or other operators either locally or remotely. Furthermore, in some cases, the monitoring terminal 190 may be used to interface with tags or nodes by providing configuration information for communication to specific tags and/or nodes. As such, according to an exemplary embodiment, the monitoring terminal 190 may also include at least a display and user interface to enable an application with a graphical user interface (GUI) tailored to enabling monitoring activities associated with and/or communicating with configurable monitoring devices. Accordingly, the GUI may also be configured to enable use of the monitoring terminal 190 for defining configuration information for provision to the tags or nodes.

Some of the example modes described above will now be discussed in greater detail to illustrate just a few examples of the flexibility of operation that is afforded by employing exemplary embodiments of the present invention. In this regard, in the security mode, the configurable monitoring device 10 may be configured to act as a tag, node, hub, gateway or the like in an anti-theft network. Furthermore, in some cases, the configurable monitoring device 10 may be configured to act as a gate device (e.g., and EAS gate) for monitoring doors or other egress/ingress routes. Sub-modes of operation within the security mode may include a monitoring mode, a tracking mode, an alarm mode and/or the like. In some embodiments, transfer of the configurable monitoring device 10 into sub-modes of the security mode may occur responsive to external instructions. However, in some cases, transfer of the configurable monitoring device 10 between modes may be accomplished responsive to real-time recognition of current conditions or stimuli. As such, the configurable monitoring device 10 may be a context sensitive device that has situational awareness. Some examples may incorporate combinations of externally controlled and situationally aware responses for the configurable monitoring device 10 to control mode changes, configuration changes and/or activities and reports undertaken by the configurable monitoring device 10.

As an example, the configurable monitoring device 10 may initially be configured by external instruction to operate in a monitoring mode during which operation of the configurable monitoring device 10 may include providing or receiving regular monitor or heartbeat signals or beacon signals or ping signals to/from other configurable monitoring devices and/or one or more base stations. For example, a configurable monitoring device configured to operate as a ping node (i.e., a configurable monitoring devices that is re-configured to support real-time locating system (RTLS) solutions to locate tags) may provide ping signals that tags may receive and report back to, for example, a monitoring terminal or other network entity, so that the monitoring terminal or other network entity will be notified that the tag is currently within range of the ping node. The tags may be configured to receive a ping signal and communicate location information (e.g., the ping node's identifier) in response to receipt of the ping signal. For example, battery status, alarm status, received signal strength, and the like may be provided in response to a ping signal. When a ping node implements a uni-directional communication protocol, the ping node will not be able to receive the data transmitted by the tag.

According to some example embodiments, the ping signals generated by the nodes may be used for locating a tag. In this regard, a tag may be configured to report to, for example, the monitoring terminal that the tag is currently within communication proximity of a ping signal provided by a particular node. The nodes may be configured to randomly, based on an algorithm, modify the beacon signal strength. When the signal strength is modified, some tags that were in range may no longer be in range, or some tags that were previously in range may now be within range of the ping signal. As tags come in and out of range, due to the changing signal strength, the signal strength at the time may be used to determine the distance that a tag is from a particular node. In some cases, if the distance is determined with respect to multiple nodes, a more accurate physical location of the tag can be determined (as compared to determining that a tag is near a single node).

According to some example embodiments, standard operating power settings (describing standard fluctuations in power) may be utilized in a standard locating mode. However, in an active locate mode, when the location of a specific article is desired, active locate power setting may be utilized.

In response to activity that may be indicative of an attempted theft, either detected locally (using a tamper detecting component) or identified remotely and communicated to the configurable monitoring device 10 from a network entity, the configurable monitoring device 10 may be configured to shift to tracking mode to track movement of itself and/or another configurable monitoring device. Then, for example, responsive to a triggering event comprising an attempt to remove the configurable monitoring device 10 from the retail outlet in which it is located, the configurable monitoring device 10 may access its functionality profile and automatically shift to alarm mode by triggering the alarm module 26 to sound an alarm. When acting in the tracking mode, the configurable monitoring device 10 may be configured as a RTLS tag if the configurable monitoring device 10 is being tracked or an RTLS locating node if the configurable monitoring device 10 is assisting in tracking of another device. As such, mode shifts may be permissible within a particular configuration. However, in some cases, new configuration information may be loaded (from external or internal sources) for each mode change.

In the marketing mode, the configurable monitoring device 10 may be configured to act as a tag or node in a network of devices aimed at marketing particular products or providing information/direction to potential customers regarding aspects or particular products or relationships between products. As an example, the configurable monitoring device 10 of a product that is selected by a customer may recognize its movement as a potential purchase and communicate with other configurable monitoring devices and/or network devices to provide helpful information to the user for identifying related products or product information in a manner that may market other goods, or services, to the potential customer.

In the inventory management mode, the configurable monitoring device 10 may provide information regarding its location and/or participate in activities associated with identifying the location of other configurable monitoring devices to facilitate inventory functions. Other modes, sub-modes and capabilities or operations associated with each mode are also envisioned.

In an exemplary embodiment, the configurable monitoring device 10 may receive a communication signal via the communication interface 22 including software or firmware for implementation by the processor 20. The communication signal may be processed by the configuration manager 24 (e.g., via the processor 20 or under control of the processor 20) to provide functionality to be realized at the configurable monitoring device 10 in accordance with the instructions provided in the software or firmware received. The instructions may define a particular role and/or mode of operation for the configurable monitoring device 10.

As an alternative, the configurable monitoring device 10 may include various pre-stored modules defining different functionality and/or operational characteristics for the configurable monitoring device 10. The communication signal may be processed by the configuration manager 24 to identify which of the pre-stored modules is to be activated or executed. The identified module may then be activated or executed by the configuration manager 24 (e.g., via the processor 20) in order to affect the operational posture and configuration of the configurable monitoring device 10 accordingly. As indicated above, in some cases, each module may correspond to and/or define a particular role and/or mode of operation for the configurable monitoring device 10.

As yet another alternative, the configurable monitoring device 10 may include various pre-stored modules including functionality profiles that define different functionality and/or operational characteristics for the configurable monitoring device 10. However, the communication signal received may not include or necessarily specify any particular one of the pre-stored modules. Instead, the communication signal received could be a signal classifiable by type, subject, content or otherwise characteristic features of the signal itself, the purpose of the signal, or the signal's content. The configuration manager 24 may then employ operational rules and/or a functional mapping directory to identify which of the pre-stored modules is to be activated or executed based on the stimuli received in the form of the communication signal. The identified module may then be activated or executed by the configuration manager 24 (e.g., via the processor 20) in order to affect the operational posture and configuration of the configurable monitoring device 10 accordingly. As indicated above, in some cases, each module may correspond to and/or define a particular role and/or mode of operation for the configurable monitoring device 10. However, in some instances, hardware devices or hardware extensions may be placed in operable communication with the configurable monitoring device 10 to include memory with pre-stored modules with or without other hardware provided functionality. In some cases, the configurable monitoring device 10 may take on a role based on the hardware added thereto (e.g., a sensor or other gate hardware may be added to create an EAS gate).

Figure 4:
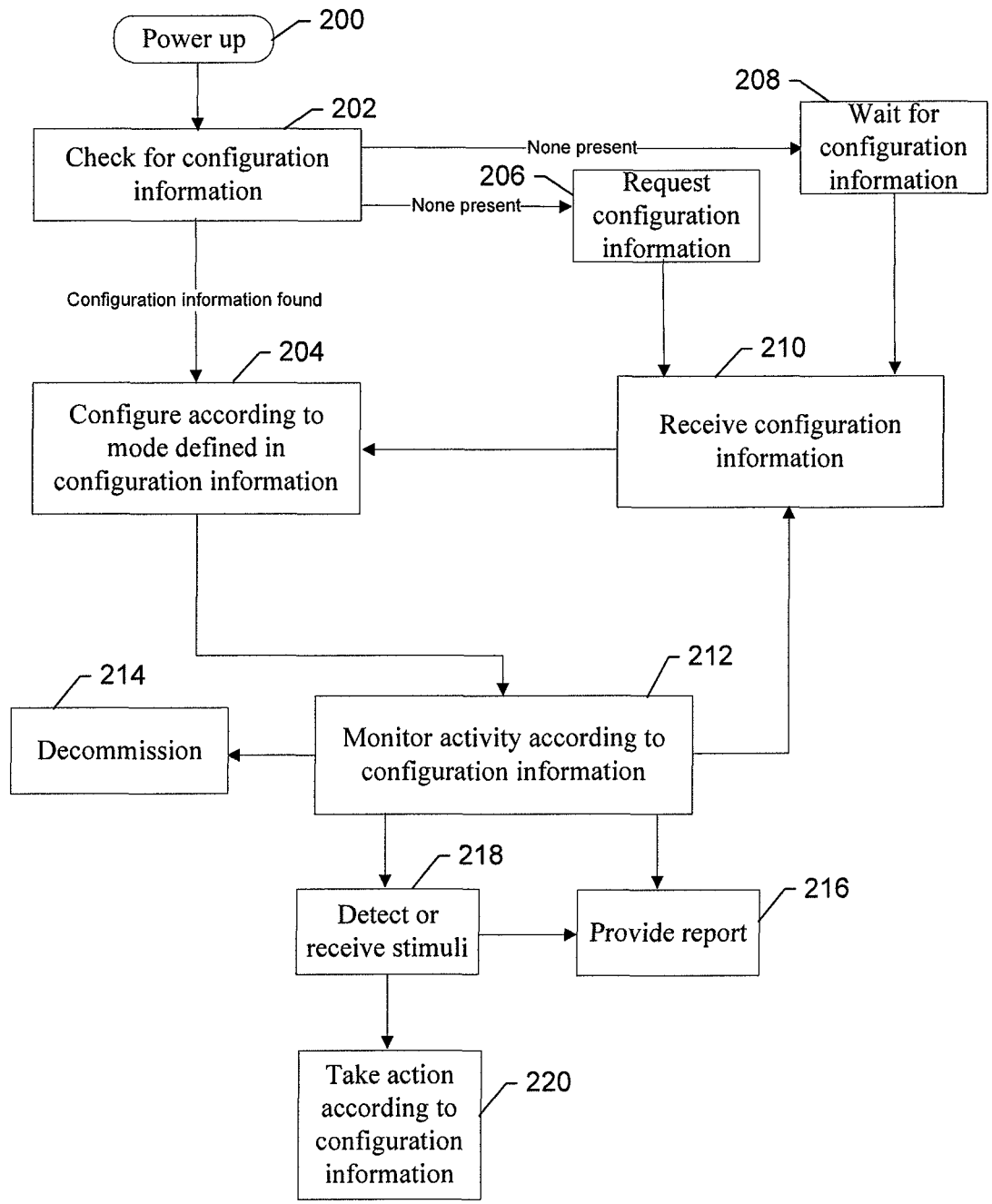
FIG. 4 illustrates an example of a flow diagram illustrating configuration of the configurable monitoring device according to an exemplary embodiment.

FIG. 4 shows an example of a flow diagram illustrating configuration of the configurable monitoring device according to an exemplary embodiment. In this regard, as shown in FIG. 4, a configurable monitoring device may initially be powered up (or initialized) at operation 200. Subsequent to power up or initialization, the configurable monitoring device may check for configuration information at operation 202. If configuration information is found, the configurable monitoring device may configure itself according to the configuration information found at operation 204. If no configuration information is found, the configurable monitoring device may either request configuration information from the nearest node or gateway at operation 206 or simply wait to receive configuration information and enter an idle mode in the meantime at operation 208. At operation 210, either in response to a request for configuration information or responsive to direction to provide configuration information to the configurable monitoring device that is either manually or automatically generated, the configurable monitoring device may receive configuration information. Reception of configuration information may trigger the configurable monitoring device to configure itself according to the configuration information found at operation 204. After being configured, the configurable monitoring device may monitor activity according to the configuration information at operation 212. At any time during monitoring, new configuration information may be received to trigger transitioning of the configurable monitoring device at operation 204. However, during monitoring, any one of several indications associated with various triggering events may received. For example, the configurable monitoring device could receive an indication to be decommissioned at operation 214, or an indication to report activity to another configurable monitoring device (e.g., a node, gateway or hub) or an external device at operation 216. In some cases, a specific stimulus (triggering event) may be detected at the configurable monitoring device or the configurable monitoring device may receive notification (indication) of the stimulus from another configurable monitoring device at operation 218. In response to the detection of the stimuli, the configurable monitoring device may report the activity at operation 216 or take action according to the configuration information (e.g., as defined by the configuration manager 24) at operation 220.

The flexible nature of the configurable monitoring device 10 of embodiments of the present invention may enable dynamic configuration of configurable monitoring devices within a network to introduce robust capabilities for providing services and functionality and, for providing updates to existing capabilities with updated configuration information. Embodiments of the present invention may be implemented by various means, such as hardware, firmware, processor, circuitry and/or other device associated with execution of software including one or more computer program instructions. For example, one or more of the procedures or activities described above may be embodied by computer program instructions. In this regard, the computer program instructions which embody the procedures or activities described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the corresponding procedure or activity. These computer program instructions may also be stored in a computer-readable storage memory (as opposed to a computer-readable transmission medium such as a carrier wave or electromagnetic signal) that may direct a computer or other programmable apparatus to function in a particular manner, such that the instructions stored in the computer-readable memory produce an article of manufacture the execution of which implements the function specified in the corresponding procedure or activity. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the corresponding procedure or activity described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this disclosure. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of this disclosure. In this regard, for example, different combinations of elements and/or functions than those explicitly described above are also contemplated as may be set forth in some of this disclosure. Although specific terms are employed herein, they are used in a generic and descriptive sense only and not for purposes of limitation.

What is claimed is:

1. A monitoring device comprising:
   a processor; and
   a memory including computer program code, the memory and the computer program code configured to, with the processor, cause the monitoring device to at least:
   receive an indication of a triggering event, wherein the triggering event is a movement of the monitoring device, a movement of another monitoring device or an alarm event of the another monitoring device; and
   transition the monitoring device into a triggered role in response to receiving the indication of the triggering event, the triggered role being one of a tag role or a node role,
   wherein the tag role includes configuring the processor to determine location information relating to the monitoring device, and wherein the node role includes configuring the processor to transmit a ping signal.

2. The monitoring device of claim 1, wherein the processor is further configured to:
   receive a second indication of a second triggering event; and
   transition from the triggered role to a second triggered role in response to receiving the second indication.

3. The monitoring device of claim 1, wherein the indication of the triggering event is an output of a sensor.

4. The monitoring device of claim 1, wherein the indication of the triggering event operates to transition only the monitoring device into the triggered role, and wherein the monitoring device is one of a plurality of monitoring devices.

5. The monitoring device of claim 1, wherein the indication is a signal received wirelessly from an external device.

6. The monitoring device of claim 1 further comprising a sensor, wherein:
   the triggering event is detected by the sensor of the monitoring device; and
   wherein the indication of the triggering event is an output of the sensor.

7. The monitoring device of claim 1, wherein the processor is further configured to:
   receive an alarm indication of an alarm event when in the tag role; and
   send a signal to an audio device, causing the audio device to emit an audio signal.

8. The monitoring device of claim 7, wherein the processor receives the alarm indication from an external security device.

9. The monitoring device of claim 8, wherein the external security device is a second monitoring device.

10. The monitoring device of claim 8, wherein the external security device is in communication proximity to the monitoring device and the external security device is affixed to a retail product.

11. The monitoring device of claim 8, wherein the external security device is a node device.

12. The monitoring device of claim 8, wherein the external security device is an EAS gate device.

13. The monitoring device of claim 7, wherein the processor receives the alarm indication from a tamper detection component.

14. The monitoring device of claim 1, wherein the monitoring device is configured to receive an alarm indication from a device in communication proximity to the monitoring device.

15. The monitoring device of claim 1 further comprising memory configured to store attribute information associated with a retail article to which the monitoring device is affixed.

16. A method for facilitating network communications using a monitoring device comprising:
    receiving an indication of a triggering event, wherein the triggering event is a movement of the monitoring device, a movement of another monitoring device or an alarm event of the another monitoring device;
    transitioning, using a processor, into a triggered role in response to receiving the indication of the triggering event, the triggered role being one of a tag role or a node role;
    in response to transitioning into the tag role, determining location information relating to the monitoring device; and
    in response to transitioning into the node role, transmitting a repeating ping signal.

17. The method of claim 16 further comprising:
    receiving a second indication of a second triggering event; and
    transitioning from the triggered role to a second triggered role in response to receiving the second indication.

18. The method of claim 16, wherein the receiving the indication of the triggering event comprises receiving an output of a sensor.

19. The method of claim 16 further comprising determining the indication of the triggering event is intended to transition only the monitoring device, the monitoring device being one of a plurality of monitoring devices.

20. The method of claim 16 further comprising receiving the indication as a wireless signal from an external device.

21. The method of claim 16, wherein receiving the indication of the triggering event includes:
    detecting the triggering event by a sensor of the monitoring device; and
    receiving the indication of the triggering event from the sensor.

22. The method of claim 16, further comprising:
    receiving an alarm indication of an alarm event when in the tag role; and
    sending a signal to the audio device, causing the audio device to emit the audio signal.

23. The method of claim 22, wherein the receiving the alarm indication comprises receiving a signal from a second monitoring device.

24. The method of claim 22, wherein the receiving the alarm indication comprises receiving a signal from an external security device.

25. The method of claim 24, wherein the receiving the signal from the external security device occurs when the external security device is in communication proximity to the monitoring device and the external security device is affixed to a retail product.

26. The method of claim 24, wherein the receiving the alarm indication comprises receiving a signal from a node device.

27. The method of claim 24, wherein the receiving the alarm indication comprises receiving a signal from an EAS gate device.

28. The method of claim 22, wherein the receiving the alarm indication comprises receiving a signal from a tamper detection component.

29. The method of claim 16 further comprising receiving an alarm indication from a device in communication proximity to the monitoring device.

30. The method of claim 16 further comprising storing, in memory, attribute information associated with a retail article to which the monitoring device is affixed.

31. A computer program product, said computer program product comprising:
    a non-transitory computer-readable storage medium having computer-readable program code embodied in said medium, said computer-readable program code which when executed by an apparatus having a processor and a memory, cause the apparatus at least to:
    receive an indication of a triggering event, wherein the triggering event is a movement of a monitoring device, a movement of another monitoring device or an alarm event of the another monitoring device;
    transition into a triggered role in response to receiving the indication of the triggering event, the triggered role being one of either a tag role or a node role;
    in response to transitioning into the tag role, determine location information relating to the monitoring device; and
    in response to transitioning into the node role, transmit a ping signal when in the node role.

* * * * *